United States Patent
Fineberg et al.

(10) Patent No.: US 8,862,841 B2
(45) Date of Patent: Oct. 14, 2014

(54) METHOD AND SYSTEM FOR SCALEABLE, DISTRIBUTED, DIFFERENTIAL ELECTRONIC-DATA BACKUP AND ARCHIVING

(75) Inventors: Samuel A. Fineberg, Palo Alto, CA (US); Pankaj Mehra, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2533 days.

(21) Appl. No.: 11/411,385

(22) Filed: Apr. 25, 2006

(65) Prior Publication Data
US 2007/0250674 A1   Oct. 25, 2007

(51) Int. Cl.
| | |
|---|---|
| *G06F 12/00* | (2006.01) |
| *G06F 13/00* | (2006.01) |
| *G06F 13/28* | (2006.01) |
| *G06F 9/26* | (2006.01) |
| *G06F 9/34* | (2006.01) |
| *G06F 11/14* | (2006.01) |

(52) U.S. Cl.
CPC ........ *G06F 11/1464* (2013.01); *G06F 11/1451* (2013.01)
USPC .......................... 711/162; 711/216

(58) Field of Classification Search
USPC ................ 711/216; 707/100, 103 R, 204
See application file for complete search history.

(56) References Cited

U.S. PATENT DOCUMENTS

| | | | |
|---|---|---|---|
| 2004/0143713 A1* | 7/2004 | Niles et al. .................... | 711/162 |
| 2005/0091234 A1 | 4/2005 | Hsu et al. | |
| 2006/0224846 A1* | 10/2006 | Amarendran et al. ........ | 711/162 |

FOREIGN PATENT DOCUMENTS

EP    1152352    7/2001

OTHER PUBLICATIONS

L.L. You C. Karamanolis "Evaluation of Efficient Archival Storage Techniques", Proceedings of the 21 st. IEEE/L2TH Nasa Goddard Conference on Mass Storage Systems Apr. 2004.*
You L L et al, "Deep Store: An Archival Storage System Architecture" Data Engineering, 2005. ICDE 2005. Proceedings. 21st Intl Conf on Tokyo, Japan Apr. 5-8, 2005, pp. 12.

* cited by examiner

*Primary Examiner* — Michael Alsip

(57) ABSTRACT

One embodiment of the present invention provides a distributed, differential electronic-data backup and archiving system that includes client computers and cells. Client computers execute front-end-application components of the distributed, differential electronic-data backup and archiving system, the front-end application components receiving data objects from client computers and sending the received data objects to cells of the distributed, differential electronic-data backup and archiving system for storage. Cells within the distributed, differential electronic-data backup and archiving system store the data objects, each cell comprising at least one computer system with attached mass-storage and each cell storing entire data objects as lists that reference stored, unique data chunks within the cell, a cell storing all of the unique data chunks for all data objects stored in the cell.

20 Claims, 32 Drawing Sheets

METHOD AND SYSTEM FOR SCALEABLE, DISTRIBUTED, DIFFERENTIAL ELECTRONIC-DATA BACKUP AND ARCHIVING

TECHNICAL FIELD

The present invention is related to distributed computing and to electronic archiving of data and, in particular, to distributed backup and archiving of electronic data that provides for differential data storage using non-distributed containers that store chunked objects.

BACKGROUND OF THE INVENTION

Since the 1960's, the computer hardware and software industries have provided a relentless and spectacular increase in the capabilities and functionalities of computer-based data processing systems. For example, contemporary office workers are typically equipped with modern personal computers ("PCs") that surpass, in processor speeds, memory sizes, and mass-storage capacities, supercomputers of only 20 years ago. Networking technologies allow PCs to be interlinked with one another and with powerful servers and other computational resources to provide extremely high-bandwidth interconnection between computer users, access by users to vast computational resources, and immense capacities for data storage and retrieval. Today, large and complex business organizations can easily implement highly interconnected, paperless work environments using relatively inexpensive, commercially available computer hardware and software products. However, as the capabilities of computer hardware and software have increased, the rate and amount of data that is generated and computationally managed in business, commercial, and even home environments, has rapidly increased. Computer users may receive hundreds of emails each day, many including photographs, video clips, and complex, multi-media documents. Moreover, many computer users routinely generate large numbers of text documents, multi-media presentations, and other types of data. Much of this data needs to be managed and stored for subsequent retrieval. Recent legislation mandates, for example, reliable storage of emails and other electronic communications generated and received in certain business environments for lengthy periods of time, spanning decades. Although it is possible to purchase ever-larger mass-storage devices and ever-increasing numbers of servers to manage backup and archiving of electronic data on the mass-storage devices, the expense, management overhead, and administrative overhead of storing and managing the large amounts of electronic data may quickly reach a point of commercial and economical impracticality. For these and other reasons, computer users, business and research organizations, vendors of computer systems and computer software, and various governmental organizations have all recognized the need for improved, more cost-effective methods and systems for backing up and archiving electronic data.

SUMMARY OF THE INVENTION

One embodiment of the present invention provides a distributed, differential electronic-data backup and archiving system that includes client computers and cells. Client computers execute front-end-application components of the distributed, differential electronic-data backup and archiving system, the front-end application components receiving data objects from client computers and sending the received data objects to cells of the distributed, differential electronic-data backup and archiving system for storage. Cells within the distributed, differential electronic-data backup and archiving system store the data objects, each cell comprising at least one computer system with attached mass-storage and each cell storing entire data objects as lists that reference stored, unique data chunks within the cell, a cell storing all of the unique data chunks for all data objects stored in the cell.

DETAILED DESCRIPTION OF THE INVENTION

Various method and system embodiments of the present invention provide for distributed, differential, electronic-data backup and archiving. These method and system embodiments are directed to backing up and archiving electronic data within backup and archiving systems that comprise multiple storage cells, each cell, in turn, comprising one or more computer systems with attached storage and memory that each implement a memory address space and a storage address space separate from the memory and storage address spaces of other cells. Embodiments of the present invention employ an embedded chunking method by which a data object is partitioned into chunks that are differentially stored. When two data objects share some number of identical chunks, the two data objects may be more economically stored by recognizing that one-half of the shared, identical chunks represent redundant information. In method and system embodiments of the present invention, although a collection of data objects is stored in distributed fashion over multiple cells of the distributed electronic archive, any particular data object is stored within a single cell, and the system attempts to collocate data objects that share identical chunks within a single cell.

In a first subsection, below, the general problem of electronic data backup and archiving is introduced. In a second subsection, a general description of data-object partitioning, or chunking is provided. In a second subsection, an overview of distributed electronic-data backup and archiving system embodiments of the present invention is provided. In a third subsection, differential storage of data objects is discussed. In a fourth subsection, generalized STORE and RETRIEVE operations carried out in distributed, differential electronic-data backup and archiving system embodiments of the present invention are discussed. In a final subsection, a detailed description of one embodiment of the present invention is provided.

Overview of Electronic Data Backup and Archiving and Associated Problems

Figure 1:
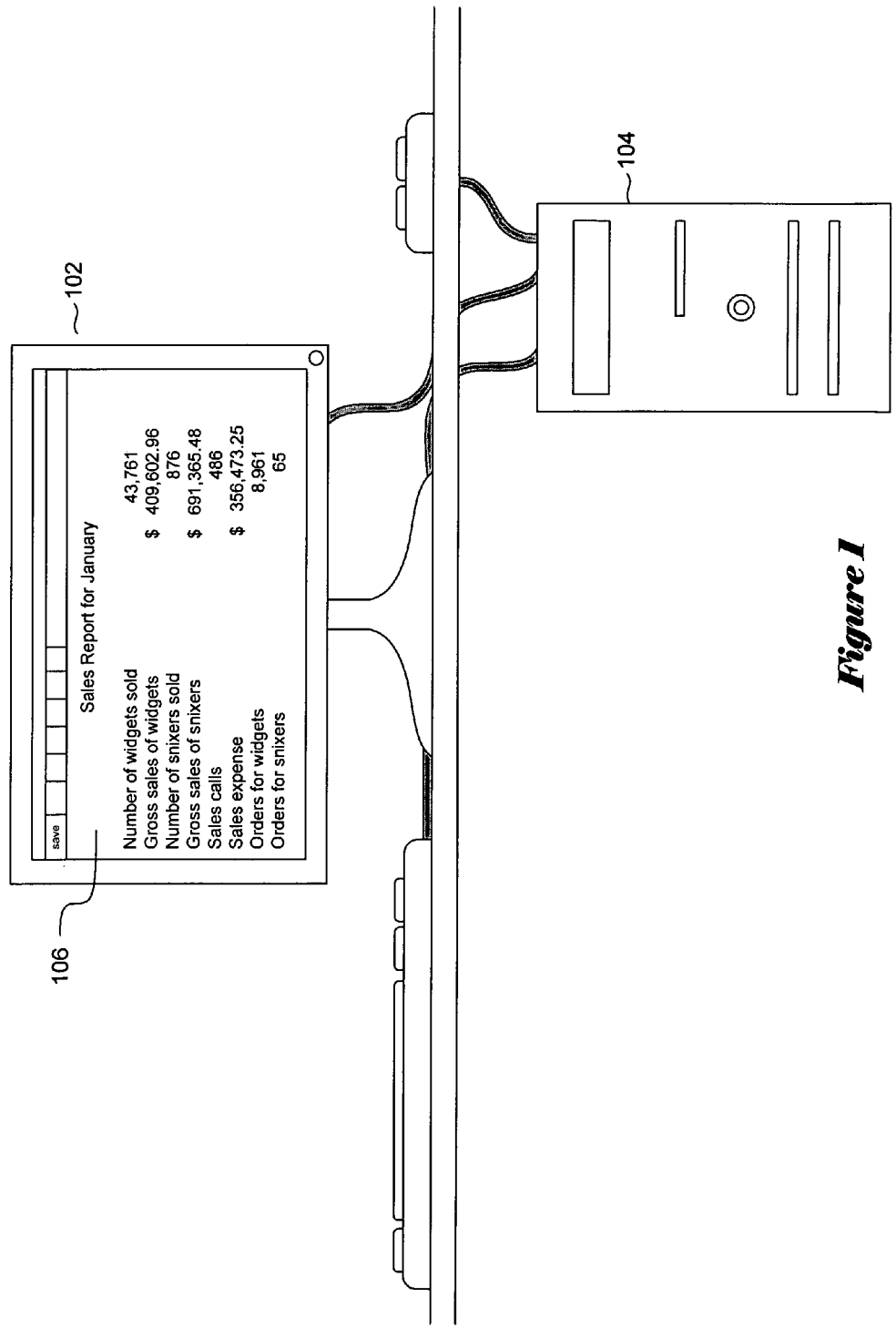
FIG. 1 shows a typical personal computer used in a home or commercial environment.

FIG. 1 shows a typical personal computer used in a home or commercial environment. Personal computers ("PCs") include high-resolution displays 102 and fast processors, large internal RAM memories, and one or more high-capacity disk drives within a main enclosure 104 that allows the PC to store and display many different types of data objects, including photographs, video clips with sound, text documents, multi-media documents, databases, a huge variety of formatted data files, and other such data objects. Many data objects, such as the sales report 106 displayed by the PC shown in FIG. 1, contain information that a user may need to store for various periods of time and refer to subsequently. Business or commercial procedures may require storage of data objects for business and legal purposes. Recently enacted legislation requires certain types of businesses to reliably retain emails and other data objects for specified periods of time, including emails and documents related to various types of asset sales. In addition to needs and requirements for archiving data objects, users may also wish to back up important data objects to protect against failure of the disk drive or other components within the user's PC.

In a first approach to backing up and archiving data, a user may invest in multiple disk drives for the PC, and store backup and archival copies of important data objects on a disk drive allocated for backup and archiving. In slightly more sophisticated systems, a user may employ two or more disk drives within a PC and operating-system features to implement an automated mirroring process by which an exact, mirror copy of a working disk drive is maintained on a separate, mirror disk drive. However, these techniques are inadequate in many commercial and even home situations. First, even when multiple disk drives are employed, theft of, or significant damage to, the PC may nonetheless lead to irretrievable loss of data. Moreover, as operating systems and application programs continue to evolve, the data objects routinely generated by users have tended to become larger and more complex, and are generated at ever-increasing rates. Therefore, a PC often lacks sufficient mass-storage capacity for long-term archiving. Finally, localized strategies for backing up and archiving data generally involve significant management and administrative overhead, as a result of which users often tend to neglect to properly maintain backed up and archived data, and frequently fail to continuously backup and archive data that they may subsequently need. Commercial and governmental organizations cannot generally rely on individual users and employees to administer data backups and data archiving.

Figure 2:
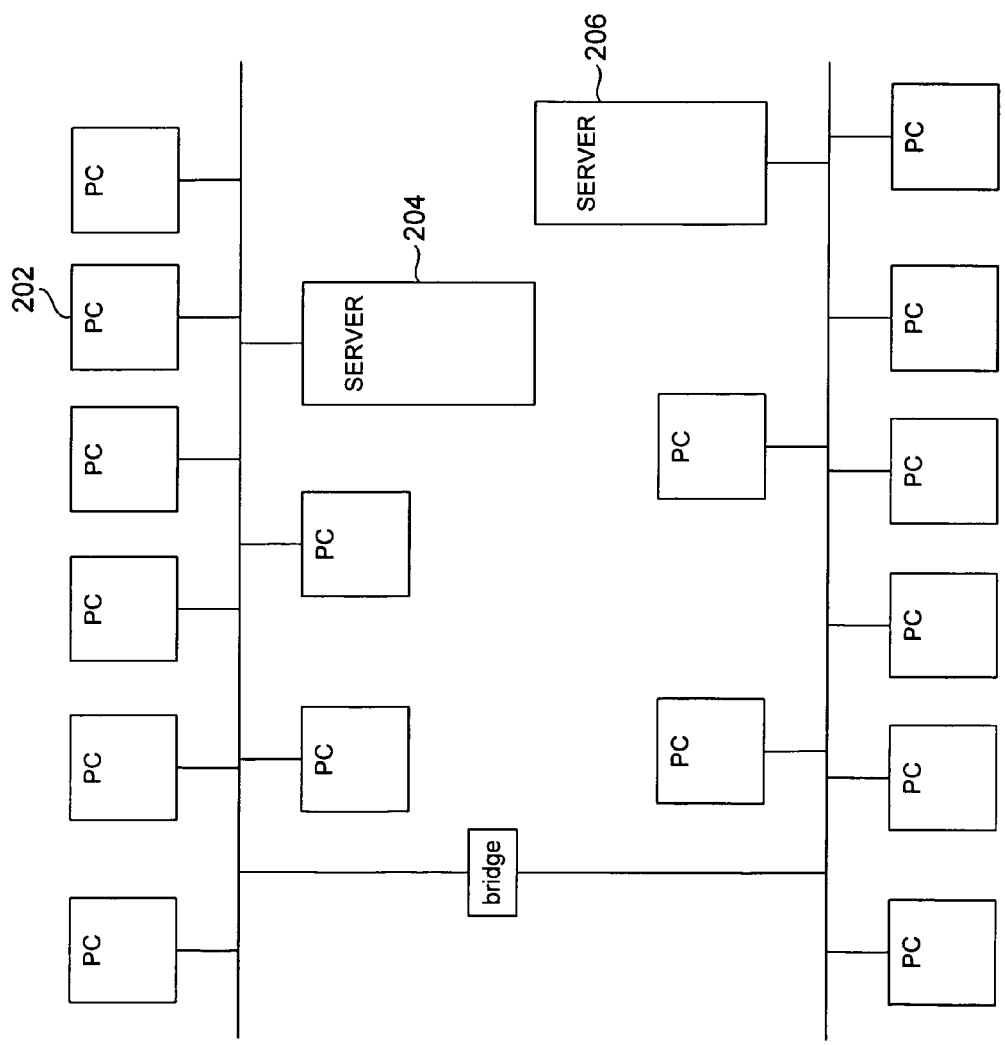
FIG. 2 illustrates a small system of networked computers that might be found within a business organization.

For all of the reasons discussed above, computer users within commercial and governmental organizations, and even certain sophisticated home users of PCs, generally centralize important backup and archiving tasks and policies on servers or larger computers to which the users' PCs are interconnected via computer networks. FIG. 2 illustrates a small system of networked computers that might be found within a business organization. Multiple PCs, including PC 202, are interconnected with one another and with two servers 204 and 206. A system administrator for the networked system generally implements and maintains automated data backup and data archiving using any number of commercially available backup and archiving products. In larger organizations, the servers may be interconnected with independent, large scale mass-storage devices, such as RAID systems, for increased storage capacity.

Networked computer systems with servers dedicated to backup and archiving tasks are far more reliable than localized backup and archiving techniques discussed with reference to FIG. 1. However, even when backup and archiving are administered by a system administrator through one or more high-end servers, serious problems may nonetheless be encountered. For example, even though the servers may be located in a room, floor, or building remote from the locations of the PCs, the entire system may still be susceptible to catastrophic damage from fires, earthquakes, or malicious employees. Furthermore, systems such as the networked computer system illustrated in FIG. 2 are often difficult to scale in order to satisfy increasing needs for data-storage capacity. Adding a new server with attached mass-storage devices may involve significant effort, on the part of system administrators and network administrators, and may require extensive redistribution of data among servers, reconfiguration of individual PCs, and other administrative and management overhead. Furthermore, managing multiple, possibly different servers and adding servers with new or revised operating systems and other components may be quite difficult. Finally, the approaches typified by the network computer system illustrated in FIG. 2 do not efficiently store redundant data. As one example, all or a majority of the employees within an organization may receive many identical emails from internal and even outside sources. These emails may include large attachments, such as .doc files, .ppt files, or .pdf files. Simplistic backup and archiving techniques may redundantly store an identical email sent to 15 employees within the organization 15 times, although a single, reliably stored copy of the email may be sufficient to meet the backup and archiving policies of the organization.

Distributed Electronic Data Archiving

In order to overcome many of the problems of localized backup and archiving, discussed above with reference to FIG.

Figure 3:
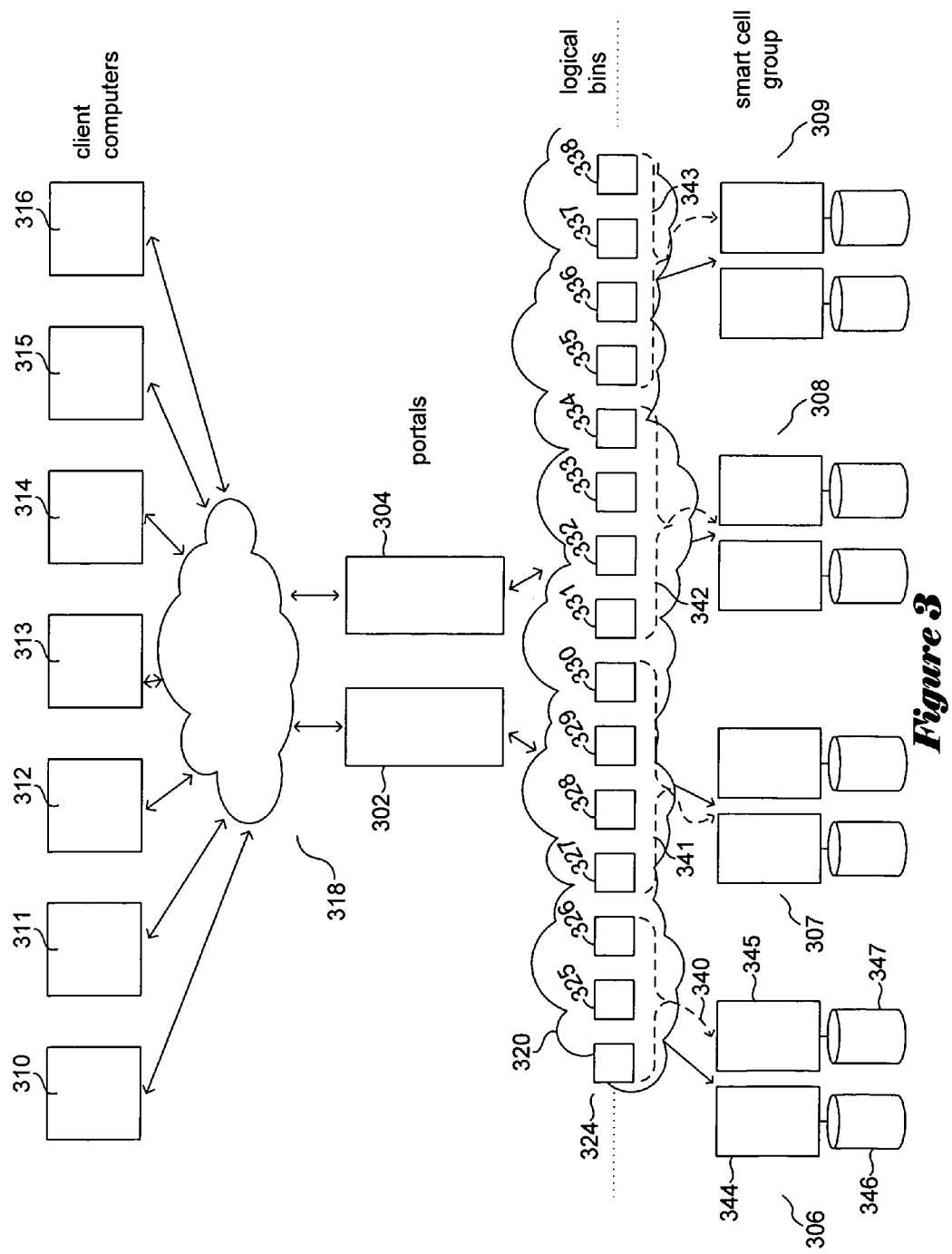
FIG. 3 illustrates the components and component organization of a distributed, differential electronic-data backup and archiving system that represents various embodiments of the present invention.

1, and with ad hoc backup and archiving methods carried out in systems of networked computers, discussed above with reference to FIG. 2, distributed electronic-data backup and archiving systems have been developed. FIG. 3 illustrates the components and component organization of a distributed, differential electronic-data backup and archiving system that represents various embodiments of the present invention. As shown in FIG. 3, one or more portals 302 and 304, generally server computers, serve as an interface between the distributed, differential electronic-data backup and archiving system, which includes both the portals and multiple cells 306-309, and a potentially large number of client computers, such as client computers 310-316 shown in FIG. 3. In the embodiment illustrated in FIG. 3, the portals receive STORE, RETRIEVE, and other requests from client computers via any of various types of communications media 318 and direct the requests received from the client computers through any of various types of communications media 320 to the cells 306-309 of the distributed, differential electronic-data backup and archiving system. Responses to the requests are transmitted from the cells back to the portals, which then distribute the responses to the requesting client computers. In certain embodiments, requests are directed by portals to logical bins 324-338 which are, in turn, mapped by the portals 344-343 to the cells 306-309, in order to facilitate addition of cells to an existing distributed, differential store in order to meet increased demands for data-storage capacity. Remapping of the bins by, for example, partitioning bins mapped to a particular cell into two groups, and assigning one grouped to a new cell, allows for simple addition of the new cell to the distributed, differential electronic-data backup and archiving system.

Each cell, such as cell 306, in the distributed, differential electronic-data backup and archiving system comprises one or more computer systems, such as the two computer systems 344 and 345 in cell 306. Each computer system has attached mass-storage devices, including attached mass-storage devices 346 and 347 connected to computer systems 344 and 345, respectively. Multiple computer systems with separate, attached mass-storage devices allow for mirroring of data stored in each cell to increase both availability and reliability of the data store.

Although the component organization shown in FIG. 3 is one example of organization of the components of a client-computer/distributed-differential-electronic-data-backup-and-archiving system, many other component configurations, organizations, and interconnections are possible. For example, in certain embodiments, client computers may directly interface to cells through one or more communications media in order to carry out STORE and RETRIEVE transactions with the distributed, differential electronic-data backup and archiving system. In other words, in certain embodiments, portals may be responsible only for receiving and forwarding a subset of requests generated by client computers or, in other embodiments, the portal-based interface may be eliminated altogether. As another example, cells in certain embodiments may comprise only a single computer system with attached storage, with data redundancy achieved by means other than inter-device mirroring. However, the component organization and interconnection shown in FIG. 3 is used in the following description of the present invention as an exemplary platform on which method and system embodiments of the present invention are implemented.

A distributed electronic-data backup and archiving system addresses many of the problems associated with PC-based backup and archiving and ad hoc backup and archiving in networked systems, discussed above with respect to FIGS. 1 and 2, respectively. The distributed electronic-data backup and restore system is an integrated system that provides a relatively simple interface to client computers and other computer resources within an organization. The distributed electronic-data backup and archiving system may be relatively easily managed through management interfaces, may be geographically distributed to prevent data loss associated with catastrophes that may affect all of the computers within a single geographical location, and is easily scaleable, as discussed above, by adding additional cells. New cells are straightforwardly accommodated by the current distributed electronic-data backup and archiving system, and the granularity of data-storage-capacity increase represented by a cell allows for non-disruptive and cost-effective tracking of data-storage-capacity needs. The management and administrative burdens associated with integrated distributed electronic-data backup and archiving systems is substantially lower than for the above-discussed ad hoc systems and PC-based backup and archiving. Finally, the distributed electronic-data backup and archiving system allows for efficient differential storage of data, as discussed in the following subsection, which significantly decreases physical data-storage requirements within an organization.

Differential Data-Object Storage

In a naïve backup and archiving system, each data object presented to the system for backup or archiving is stored in its entirety. In such systems, the data-storage capacity needed for operation of the system is proportional to the sum of the sizes of the data objects stored by client computers into the system.

A more efficient backup and archiving system employs differential storage of data objects. Differential storage of data objects involves recognizing redundant data shared by data objects and storing the data objects in a manner by which physical storage of redundant data can be decreased or avoided. In differential backup and archiving systems, the data-storage capacity requirements for the system are proportional to the collective size of unique data within the data objects stored into the system by client computers, rather than to the sums of the sizes of the stored data objects.

There are many different methods for implementing a differential backup and archiving system. FIGS. 4A-D illustrate a chunking method used in various embodiments of the present invention for differential storage of data objects. FIGS. 4A-D illustrate a simple version of the chunking method in order to most clearly and concisely describe chunking at an overview level. In a subsequent subsection, a slightly more complex chunking method used in certain embodiments of the present invention is described.

Figure 4A:
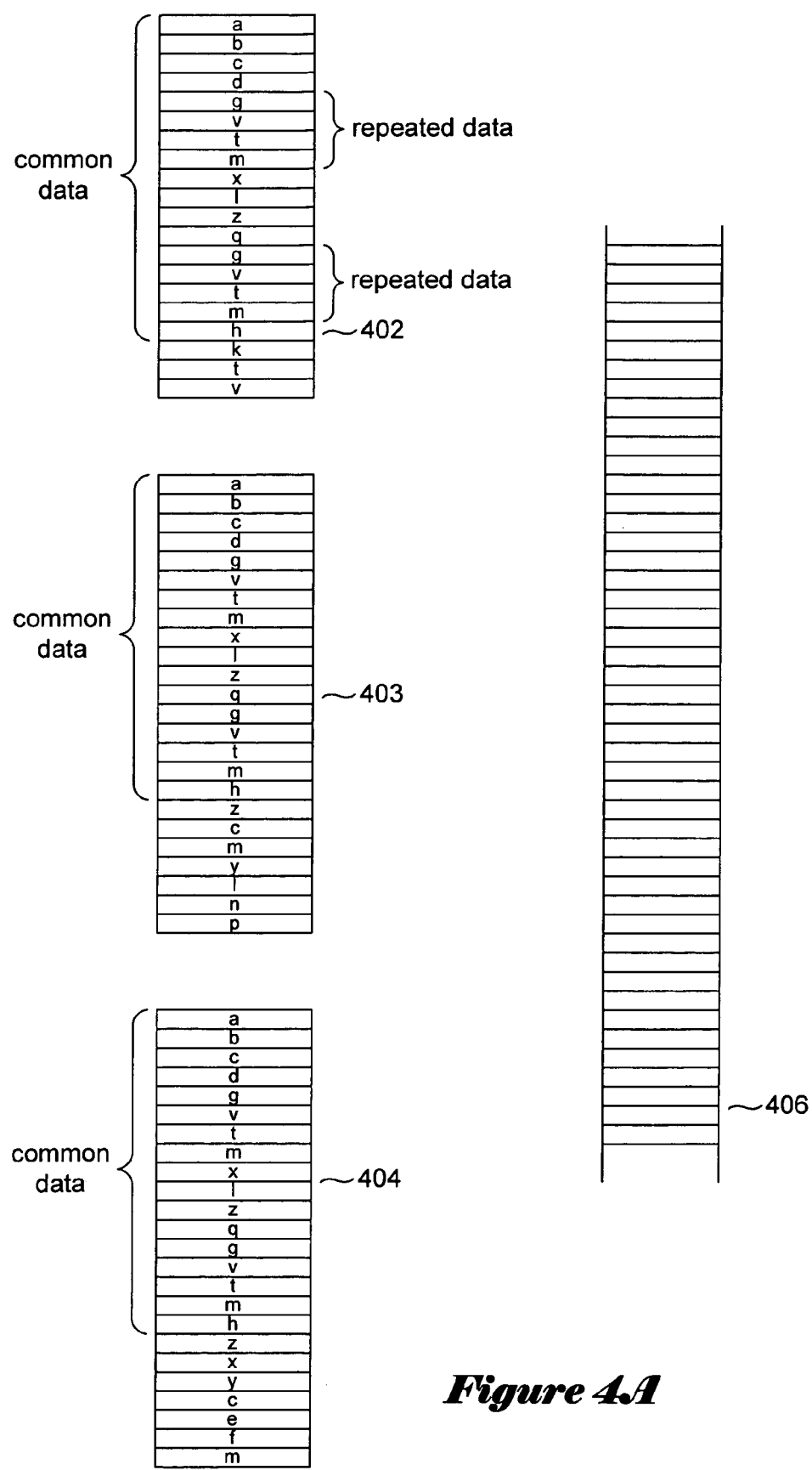
FIGS. 4A-D illustrate a chunking method used in various embodiments of the present invention for differential storage of data objects.

FIG. 4A shows three data objects 402-404. Each data object is represented as a column of values of unspecified length, each value represented by a small-case letter. In general, data objects may contain thousands, millions, or billions of bytes, but the simplified illustration conventions used in FIGS. 4A-D allow for greater clarity of illustration. FIG. 4 also shows a hash-value index 406. The hash-value index is illustrated in FIG. 4A, and in subsequent figures, as a linear sequence of data values addressable by hash value, although, as discussed below, more efficient hash-value-index implementations are typically employed in real-world systems. Use of the hash-value index is described below. Inspection of the three data objects 402-404 reveals that the three data objects include a large amount of shared, common data. The data objects differ from one another only in the final values that follow the commonly shared data. Such shared initial data is frequently encountered when multiple versions of text documents are stored. Often, new data is appended to an existing data object to create a new data object. A differential electronic-data backup and archiving system seeks to store data objects in a way to avoid storing multiple copies of the common data.

Figure 4B:
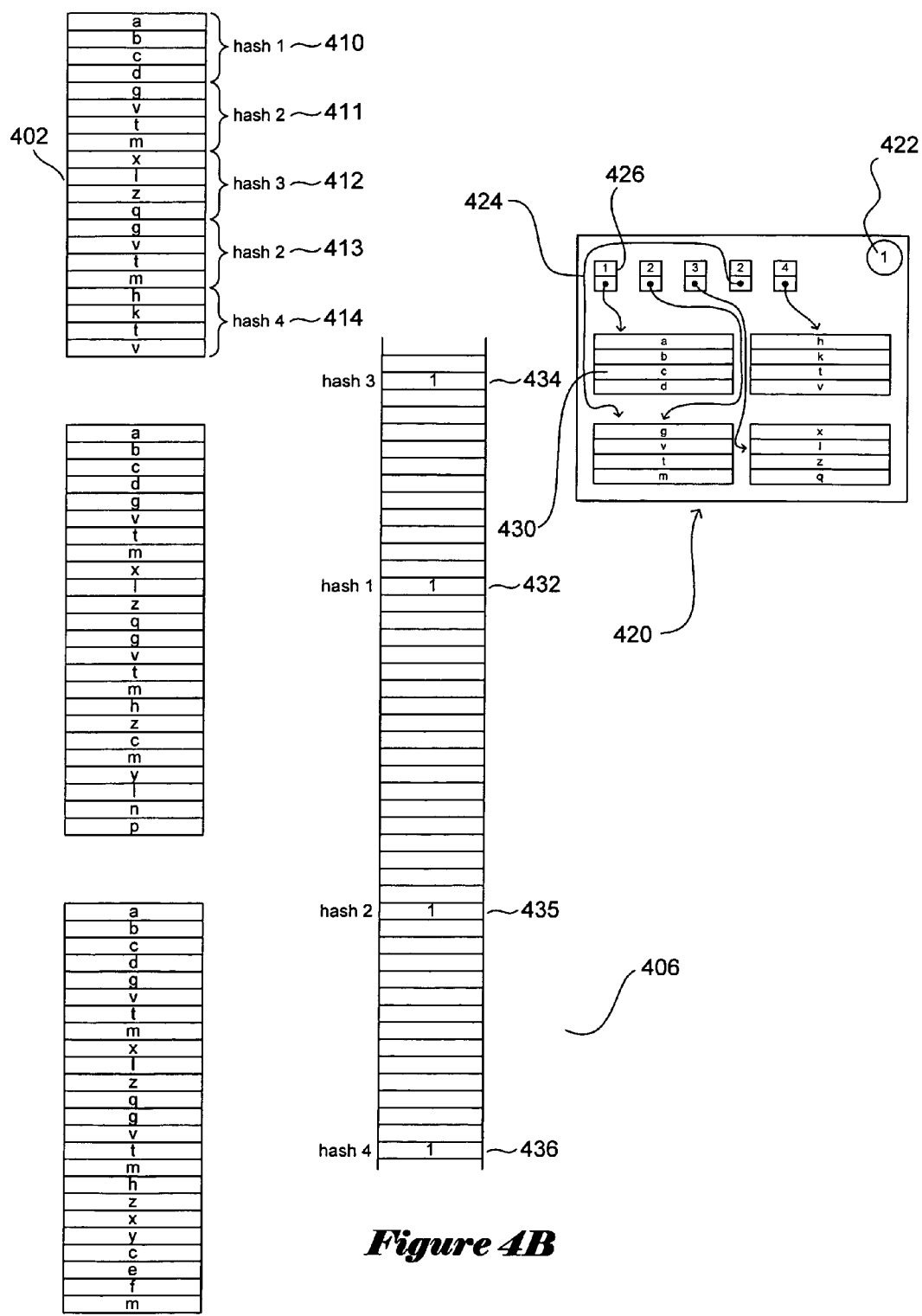

FIG. 4B illustrates storing of the first data object 402 of Figure A by a differential electronic-data backup and archiving system. In a first step, the data object 402 is partitioned into a sequence of chunks, or small, contiguous sets of data objects. Each chunk is then hashed using a collision-resistant hash function, such as SHA-1 or SHA-2, or any other hashing technique to generate a hash value corresponding to the chunk. Hash values are essentially long, digitally-encoded numbers, and different hash functions map much longer data values to shorter hash values, essentially assigning a name to each data value that is hashed by the hash function. The term "hash value" is used to mean, in the current invention, any numeric value shorter than a data chunk that can be generated to name or identify the data chunk, and may be generated from a data chunk by well-known hash functions or by other computational methods. In FIG. 4B, data object 402 is partitioned into five data chunks 410-414 associated with hash values hash1, hash2, hash3, and hash4 computed from the contents of the data chunks. In general, each data chunk is associated with a different hash value, since the hash values are determined by the data contents of the chunk. However, note that the second and fourth chunks 411 and 413 are both associated with the same hash value, hash2. Referring back to FIG. 4A, the second and fourth chunks both contain the exact same data values. The fourth chunk represents repeated data within the first data object.

In a differential store method, only the data chunks associated with unique hash values need to be stored. One or more container objects may be allocated for storing these chunks. The four unique chunks of data in the first data object 402 are stored in a container object 420, as also shown in FIG. 4B. The container object is associated with a container identifier, or container ID 422. The container object includes an ordered hash list 424, each node of which represents a corresponding data chunk within the data object. Each node includes the hash value associated with the data chunk along with a pointer, or reference, to the stored data chunk. For example, the first data chunk 410 in the first data object 402 is represented in the hash list by a first node 426 that stores an indication of the hash value, hash1, associated with the data chunk and a reference to the stored data chunk 430. The hash list is sequentially ordered by data-chunk position. Container 420 therefore stores the first data object 402 by storing a hash list that describes data object 402 and by storing only the unique data chunks within the first data object 402. The hash-value index 406 is updated by entering the container ID "1," representing the container 420 storing the first data object 402, into each slot, or entry, indexed by one of the hash values associated with the data chunks within the first data object. For example, the container ID "1" that identifies the container 420 storing the first data object 420 is inserted into the hash-value-index entry 432 indexed by the hash value hash1 computed for the first data chunk 410 in the first data object 402. The container ID "1" is similarly entered into three additional entries 434-436 of the hash-value index corresponding to the other hashes computed for data chunks in the first data object.

Figure 4C:
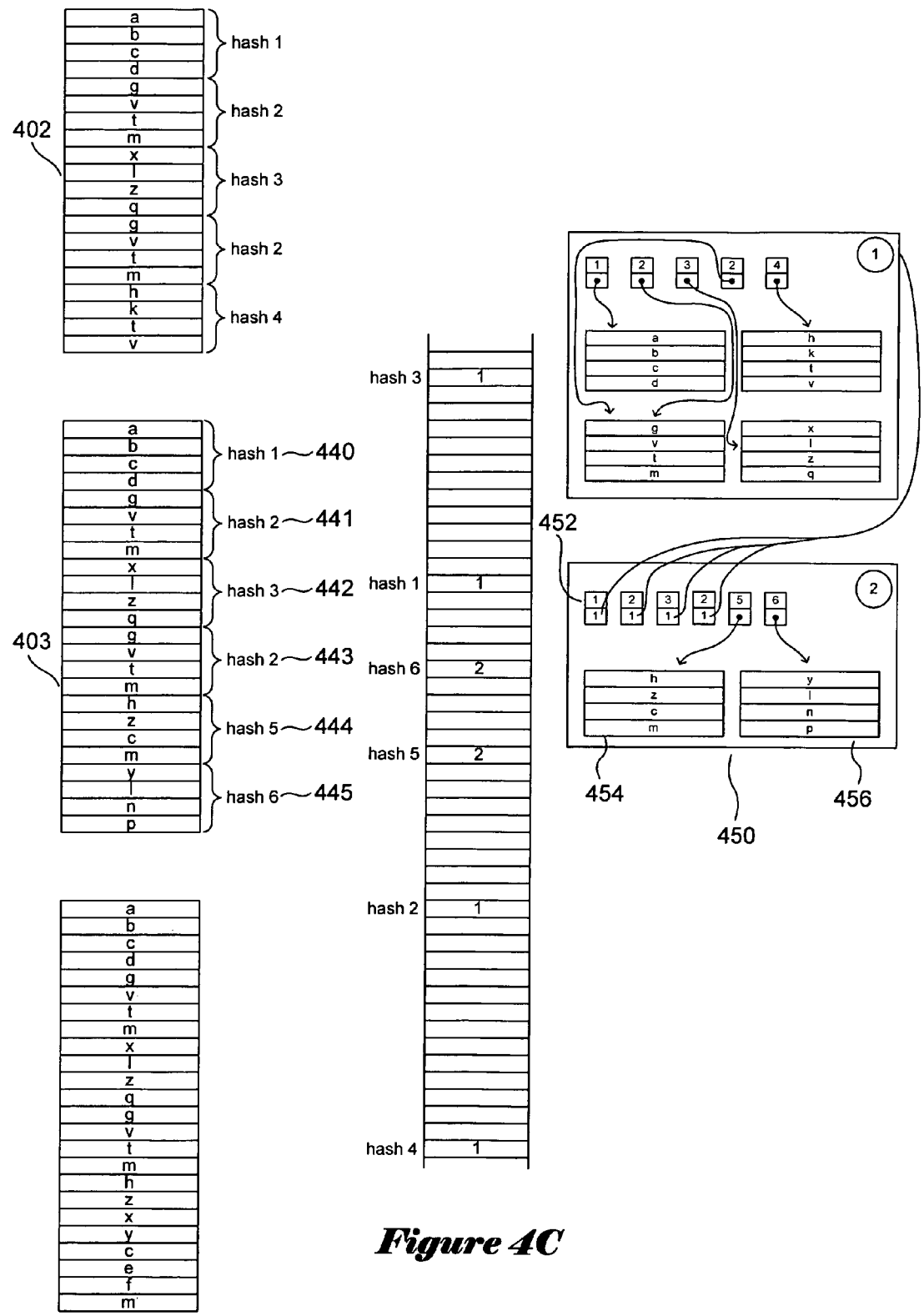
Figure 4D:
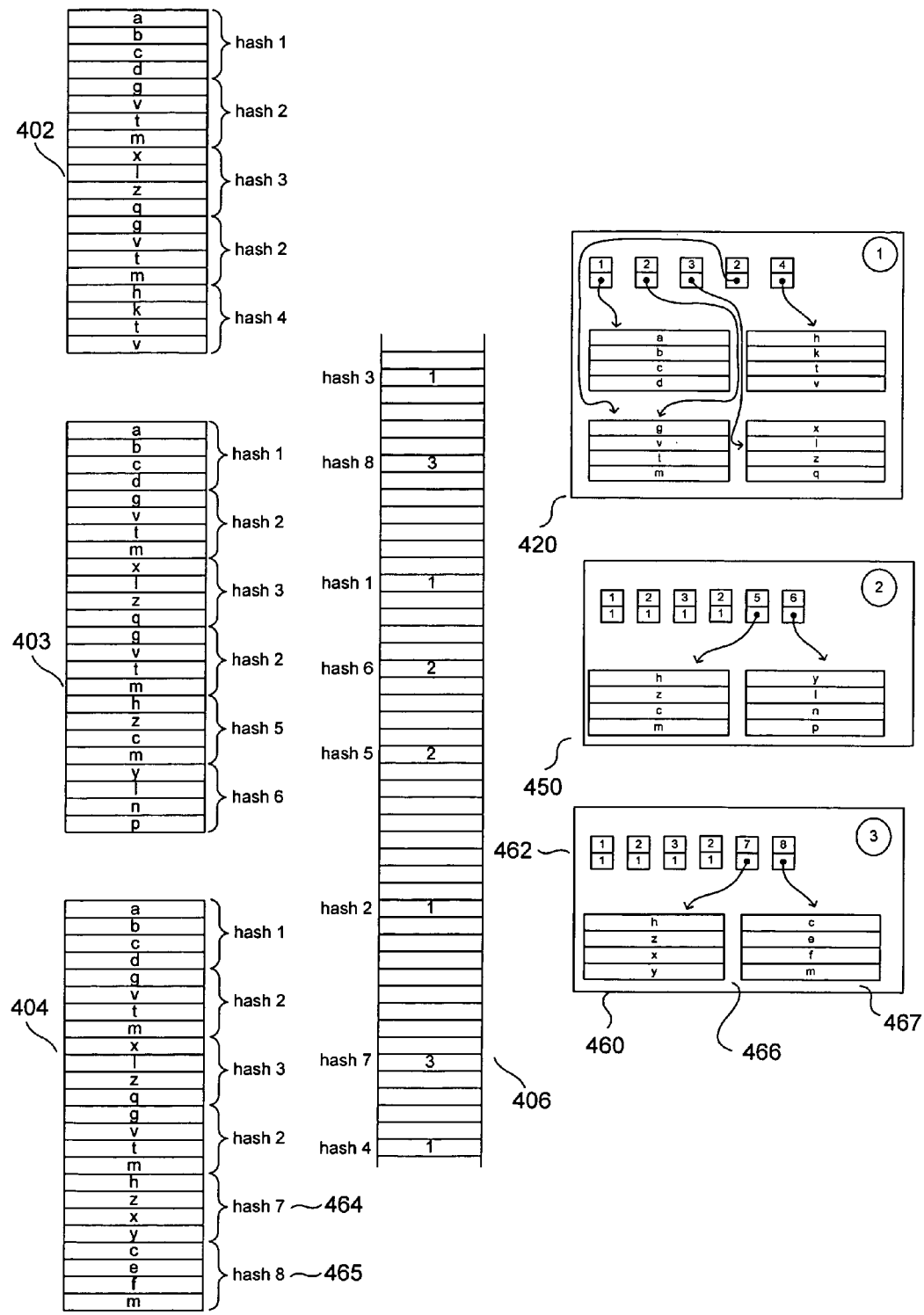

FIG. 4C illustrates storing of the second data object of the three data objects shown in FIG. 4A. Steps similar to those used to store the first data object, shown in FIG. 4B, are used in storing of the second data object. First, the second data object 403 is partitioned into six data chunks 440-445, and a hash value is computed for each of the six chunks. As shown in FIG. 4C, the first four data chunks and corresponding hash values for the second data object 403 are identical to the first four data chunks and corresponding hash values of the first data object 402. A second container object 450 is allocated for storing the second data object, and includes a hash list 452 describing the second data object as well as the two unique data chunks 454 and 456 and corresponding hash values hash5 and hash6. FIG. 4D illustrates storing of the third data object of the three data objects shown in FIG. 4A. As a result of differential storage of the three data objects, as shown in FIG. 4D, three container objects 420, 450, and 460 corresponding to the three data objects 402, 403, and 404, respectively, have been allocated and stored. The three container objects contain a total of eight unique, stored data chunks. By contrast, the three data objects 402-404 contain a total of 17 data chunks. Thus, ignoring the overhead of the containers and hash lists stored within the containers, less than half of the total storage space required for storing each of the three data objects in their entirety is needed for storing the unique data chunks contained within the three data objects. The hash-value index 406, along with the hash lists stored within each container, allow for data objects to be easily reconstructed. For example, having retrieved the third container 460 representing the third data object 404, the hash list 462 can be used to assemble, in order, each of the data chunks that together compose the third data object 404. The last two data chunks within the third data object 464-465 are physically stored within the third container 466-467. The first four data chunks are stored in the first container 420. These are easily found by using the hash values stored in the hash list 462 as indexes into the hash-value index 406 to identify the container ID for the container that stores the data chunk, and then consulting the hash list within the container that stores the data chunk to find the data chunk.

Typically, in differential electronic-data backup and archiving systems, data chunks may have relatively large sizes. For example, in one embodiment of the present invention, fixed-size data chunks of 32 kilobytes are employed. Data chunks may be either of fixed lengths or of variable lengths. Variable-length data chunks may provide for better compression ratios, allowing for a greater fraction of redundant data to be recognized and efficiently stored, but may also entail increased computational overhead. Data chunks may additionally be compressed, either by front-end client-resident applications, by portals, or by cells, in order to gain further storage-space efficiency. Moreover, larger chunks may compress to a greater compression level, so larger chunk sizes may be favored, or compression of multiple chunks combined together may provide greater overall compression. Any of various well-known compression techniques may be used for compressing data chunks. Typically, relatively large hash values are generated for associating with data chunks. In one embodiment of the present invention, 20-byte hash values are generated using the SHA-1 cryptographic hash algorithm or 32-byte hash values are generated using the SHA-2 cryptographic hash function. Large hash values are used to ensure an extremely low probability that two different data chunks may be assigned the same hash value. Assigning the same hash value to two different data chunks would result, in the data-chunking method illustrated with reference to FIGS. 4A-D, in lost data. Appropriate choice of hash functions and hash-value lengths can ensure that the probability of two different data chunks having the same hash value is less than the probability of equivalent data loss occurring through hardware and/or software errors in the distributed, differential electronic-data backup and archiving system.

Figure 5:
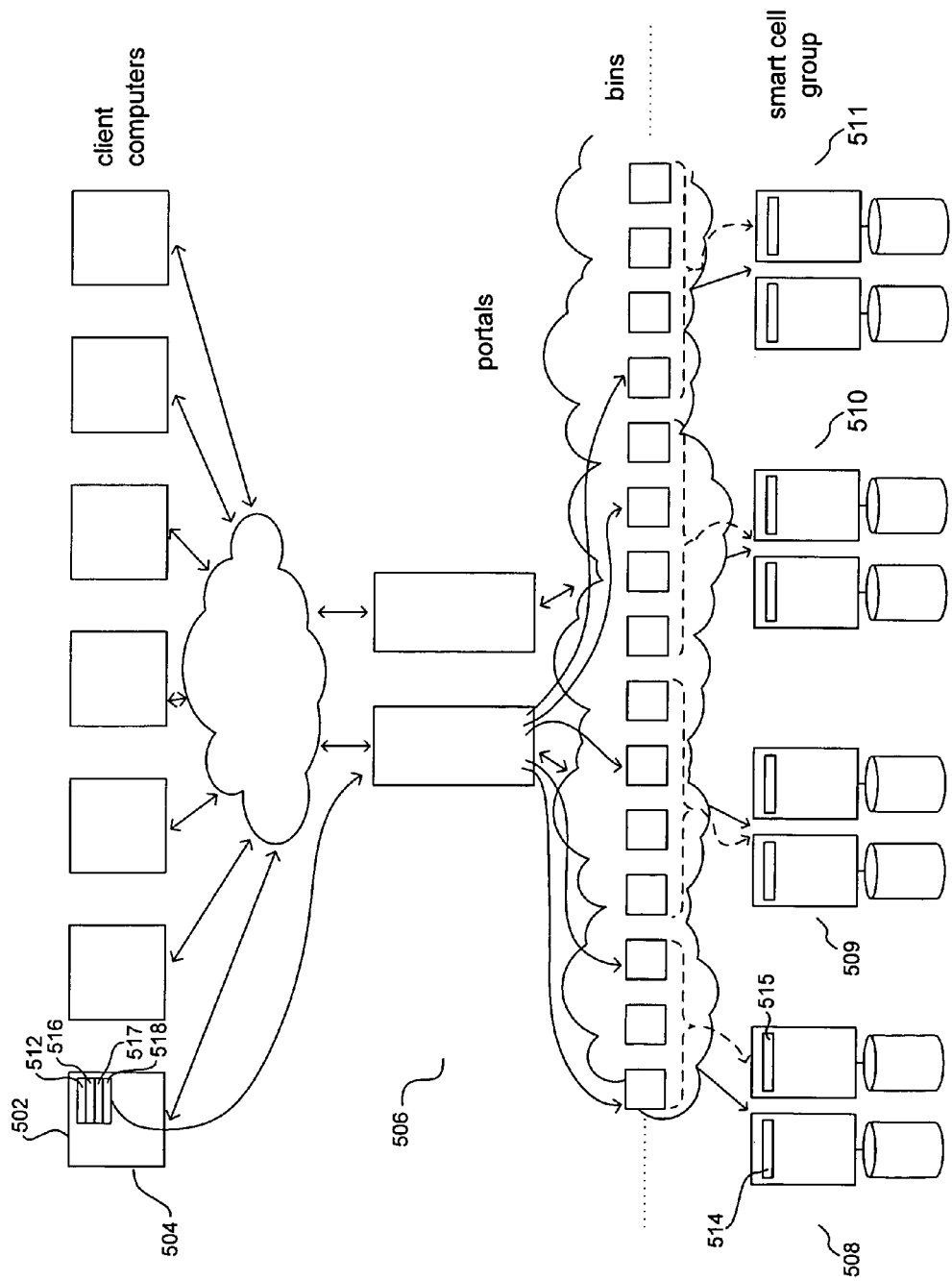
FIGS. 5 and 6 illustrate, using the illustration conventions of FIG. 3, two different ways for employing the data chunking method described with reference to FIGS. 4A-D within a distributed, differential electronic-data backup and archiving system organized as illustrated in FIG. 3 and representing an embodiment of the present invention.
Figure 6:
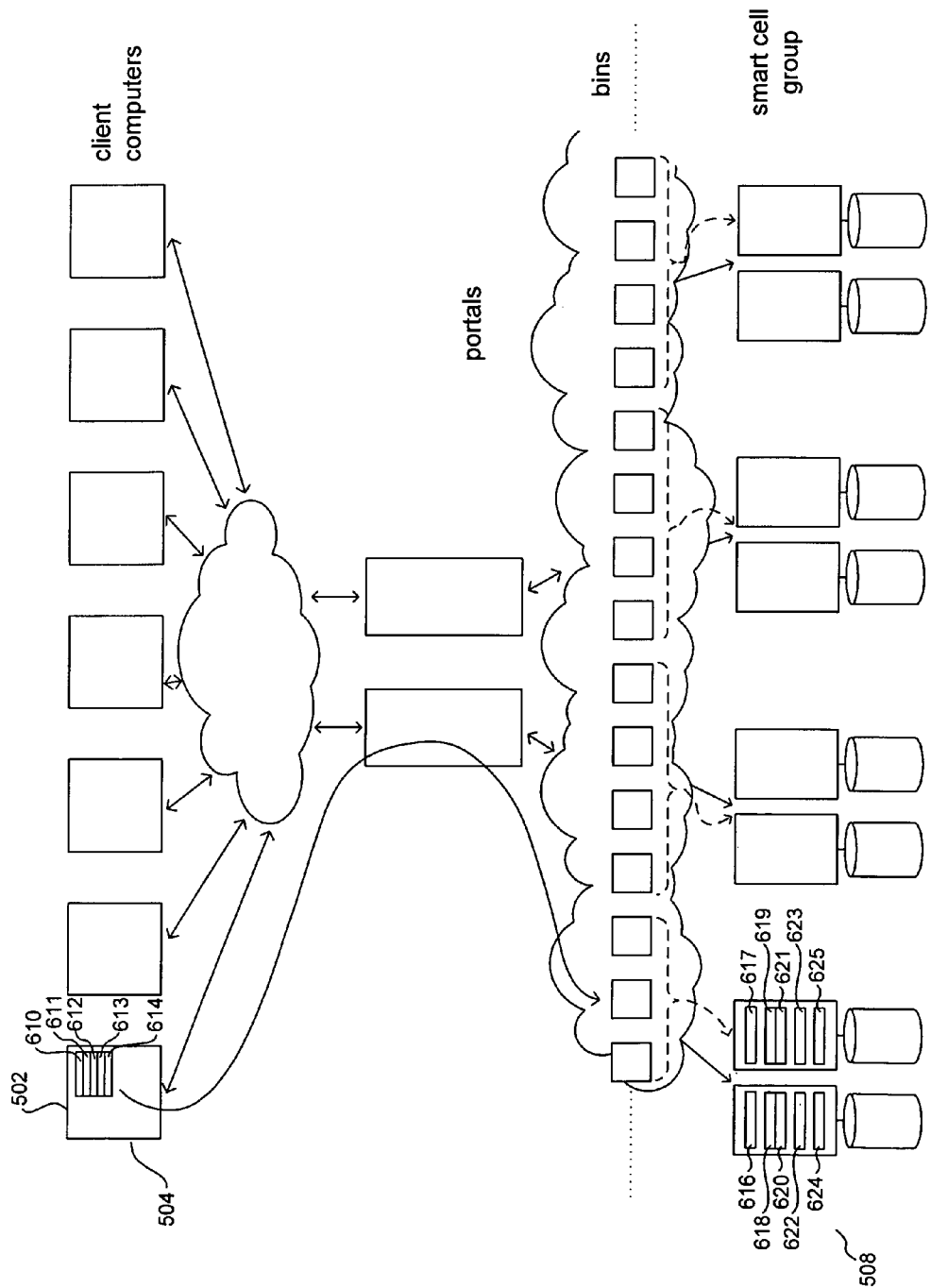

FIGS. 5 and 6 illustrate, using the illustration conventions of FIG. 3, two different ways for employing the data chunking method described with reference to FIGS. 4A-D within a distributed, differential electronic-data backup and archiving system organized as illustrated in FIG. 3 and representing an embodiment of the present invention. In one method, illustrated in FIG. 5, the unique data chunks of a given data object 502 stored by a client computer 504 within the distributed, differential electronic-data backup and archiving system 506 may be distributed across multiple cells 508-511. For example, the first unique data chunk 512 may be stored 514-515 as a mirrored pair of data chunks on the first cell 508, while successive unique data chunks 516-518 are stored as mirror pairs on the remaining cells 509-511. Distribution of the unique data chunks of data objects across multiple cells generally leads to the best possible compression ratios for stored data, may facilitate even distribution of data across the cells of the distributed, differential electronic-data backup and archiving system, but suffers the disadvantages of: (1) poor locality of reference when storing and retrieving data objects; (2) a possibility for losing some data for a significant fraction of stored objects when any given cell of the distributed, differential electronic-data backup and archiving system malfunctions; and (3) difficulty in deleting data chunks when the last data object that contains the data chunks is deleted. As discussed above, those data chunks shared with other data objects within a data object may be stored in different data containers than the container that stores the data object's description. Therefore, both storing and retrieving operations may require locating the different data containers in order to construct hash lists for the data object, during STORE operations, and in order to retrieve the data chunks of a data object, during RETRIEVE operations. For this reason, distribution of the data chunks contained in a particular data object across multiple cells may result in significant inter-cell messaging and data traffic, increased latency for STORE-and-RETRIEVE operations, and other such problems. When the unique data chunks of a data object are distributed across multiple cells, each cell of a distributed, differential electronic-data backup and archiving system may end up storing one or more unique data chunks associated with a large fraction of the data objects stored within the system. Therefore, should the cell malfunction, a large fraction of the stored data objects may be corrupted or lost. However, fully distributing unique data chunks within a distributed, differential electronic-data backup and archiving system may provide for the highest compression ratios, since once a unique data chunk has been stored for any data object, that data chunk is available for reference from the hash list of any subsequently stored data object that shares the data chunk.

FIG. 6 illustrates an alternative method for applying data chunking within a distributed, differential electronic-data backup and archiving system. In the system shown in FIG. 6, all of the unique data chunks of a given data object 502 stored by a client computer 504 are stored in a single cell 508. Assuming all of the data chunks in the data objects shown in FIG. 6 are unique, data chunks 610-614 are stored as data-chunk pairs 616-617, 618-619, 620-621, 622-623, and 624-625, in cell 508. Various embodiments of the present invention employ the data chunking method illustrated in FIG. 6. No data-chunk references are allowed to data chunks outside the cell in which the references are stored. In addition, various embodiments of the present invention seek to collocate, as much as possible, all data objects that share unique data chunks within the same cell, to further facilitate fast and efficient STORE-and-RETRIEVE operations. Moreover, by storing data objects entirely within a cell, malfunction of a cell may corrupt or destroy only those data objects stored within the cell, rather than a large fraction of data objects stored within the entire distributed, differential electronic-data backup and archiving system. The disadvantage of the chunking method illustrated in FIG. 6 is that, in the case that data objects sharing unique data chunks cannot be collocated within a single cell, multiple copies of the unique data chunks need to be stored within the distributed, differential electronic-data backup and archiving system, leading to reduced compression ratios for data-object storage. However, in general, in most organizations, data objects that share unique data chunks are often relatively closely related, so that data objects can be relatively cleanly and efficiently partitioned between cells to avoid inter-cell references. Increased efficiency of STORE-and-RETRIEVE operations and the increased reliability associated with storing complete data objects in a single cell more than offset the slight increased redundancy in physical data storage associated with the data-chunking method illustrated in FIG. 6. Alternative embodiments may employ aggressive collocation of data objects that shared data chunks, but relax the above-mentioned prohibition of inter-cell references, in order to achieve greater compression ratios.

Figure 7:
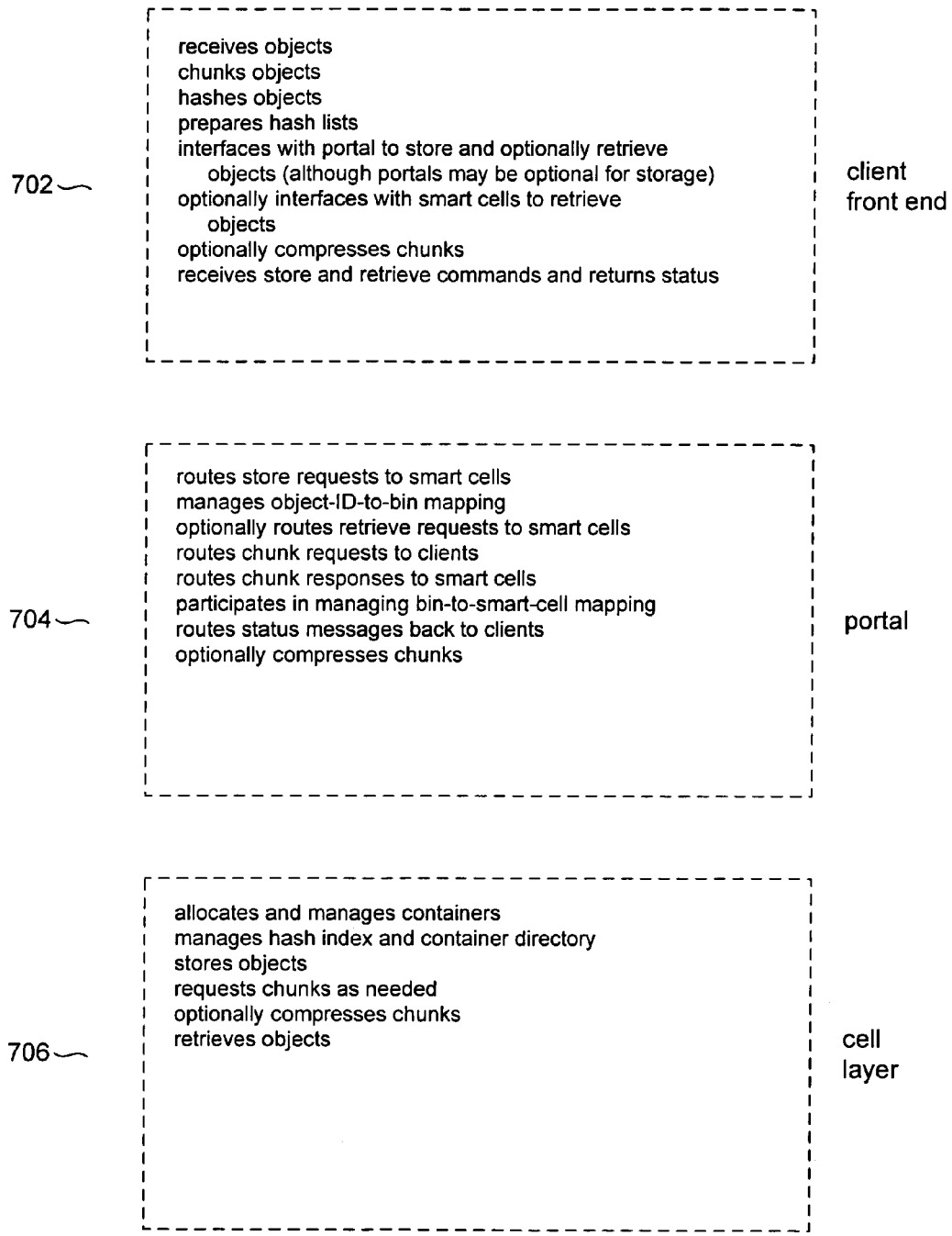
FIG. 7 shows the overall functionality of each of the three main layers of components within a distributed, differential electronic-data backup and archiving system that represents one embodiment of the present invention.

FIG. 7 shows the overall functionality of each of the three main layers of components within a distributed, differential electronic-data backup and archiving system that represents one embodiment of the present invention. These three main layers include: (1) the client-computer layer (310-316 in FIG. 3) and, more specifically, the front-end application routines of the distributed, differential electronic-data backup and archiving system that execute on the client computers 702; (2) the portal layer (302 and 304 in FIG. 3), including the distributed, differential electronic-data backup and archiving system application programs 704 running on the portal computers; and (3) the cell layer (306-309 in FIG. 3), including the software programs 706 and data stored within the cells.

As shown in FIG. 7, the front-end application programs running on client computers that implement the front-end portion of the distributed, differential electronic-data backup and archiving system is responsible for: (1) receiving STORE, RETRIEVE, and other commands from the client computer and returning status and/or data responses to those commands; (2) receiving data objects for storage; (3) chunking data objects and generating hash values corresponding to each data chunk; (4) preparing hash lists that describe the data object; (5) transmitting STORE requests along with hash lists and data chunks to portals or directly to cells in order to execute received STORE requests; (6) transmitting received RETRIEVE requests to portals or, in certain embodiments, directly to cells of the distributed, differential electronic-data backup and archiving system; (7) receiving data chunks or unchunked data objects back from the portals or cells, recomposing data objects from data chunks, and returning data objects to client-computer routines as responses to RETRIEVE requests; and (8) optionally compressing data chunks prior to transmitting data chunks to portals or cells as part of STORE requests. The front-end application may provide additional services and information, such as, for example, distributed-differential-electronic-data-backup-and-archiving-system management interfaces, additional operations, and other additional functionality.

In one embodiment of the present invention, as shown in FIG. 7, the one or more portal computers serve to interface client computers with the distributed, differential electronic-data backup and archiving system. Portals are responsible for: (1) routing STORE requests and RETRIEVE requests to appropriate cells; (2) managing object-ID-to-bin mappings, so that data objects identified by object IDs can be located by portals within the distributed, differential electronic-data backup and archiving system; (3) routing data chunks from client computers to cells during execution of STORE requests and from cells to client computers during execution of RETRIEVE requests; (4) participates, as part of a collective, portal-based management protocol, in managing bin-to-cell mappings as part of the routing function provided by the portals and to facilitate expansion of the number of cells within a distributed, differential electronic-data backup and archiving system; (5) transmitting messages from cells back to client computers; and (6) optionally compresses chunks or groups of chunks prior to forwarding them to cells. As discussed above, in alternative embodiments, the portals may not route all request and data traffic between clients and cells, and in still additional embodiments, the portal level may not be used.

The cells of the distributed, differential electronic-data backup and archiving system are responsible for storing unique data chunks and for maintaining hash indexes and, in certain embodiments, container directories to facilitate identifying the locations of stored data chunks based on hash values. Specifically, cells are responsible for: (1) allocating and managing containers; (2) managing a hash-value index and, optionally, a container directory; (3) storing unique data chunks and representations of data objects; (4) identifying and requesting unique data chunks from clients during execution of STORE requests; (5) in certain embodiments, compressing data chunks; and (6) retrieving data chunks during execution of data-object-RETRIEVE requests. Cells may be responsible for execution of additional types of requests, management tasks, including deletion of data objects and unique data chunks, reorganization of the stored data, failover tasks, and many other additional tasks and functions.

In alternative embodiments of the present invention, the functionalities assigned to different component levels of the distributed, differential electronic-data backup and archiving system may be rearranged and assigned to alternative component levels, or may be partitioned between other component levels in order to achieve better efficiency and performance under specific circumstances. For example, data-chunk compression may be carried out by client-computer front-end applications, by portal computers, or within cells. Data compression may involve significant computational overhead, and, under different circumstances, any one of the different component levels may represent a computational bottleneck. For example, under high STORE-and-RETRIEVE request loads, it is generally desirable to carry out compression either on client computers or in cells, since portal computers may be burdened by the need to route requests and responses between client computers and cells. Under many circumstances, client computers may have a large amount of unused processor cycles, and may therefore be the best candidate for offloading compression tasks and other computationally intensive tasks. As another example, data objects may be transferred whole from client computers to portals, and chunked either at the portal component level or within cells. As still another example, once a route is established between a client computer and cell during a STORE operation, the STORE operation and subsequent operations may be carried out directly between the client computer and cell, without the portal continuing to play an intermediary role. In certain cases, portals may cache frequently accessed data, or an additional level of data caches may be inserted between portals and storage cells. An almost limitless number of different alternative embodiments are possible.

Store and Retrieval Operations within a Distributed Differential Electronic-Data Backup and Archiving System that Represents One Embodiment of the Present Invention In this subsection, exemplary STORE and RETRIEVE operations are discussed with respect to each of the main component layers of an exemplary distributed, differential electronic-data backup and archiving system, as shown in FIG. 7. This subsection provides an overview of STORE and RETRIEVE operations, but many embodiments of the present invention may differ with respect to various details in implementation of STORE and RETRIEVE operations, as discussed below.

Figure 8A:
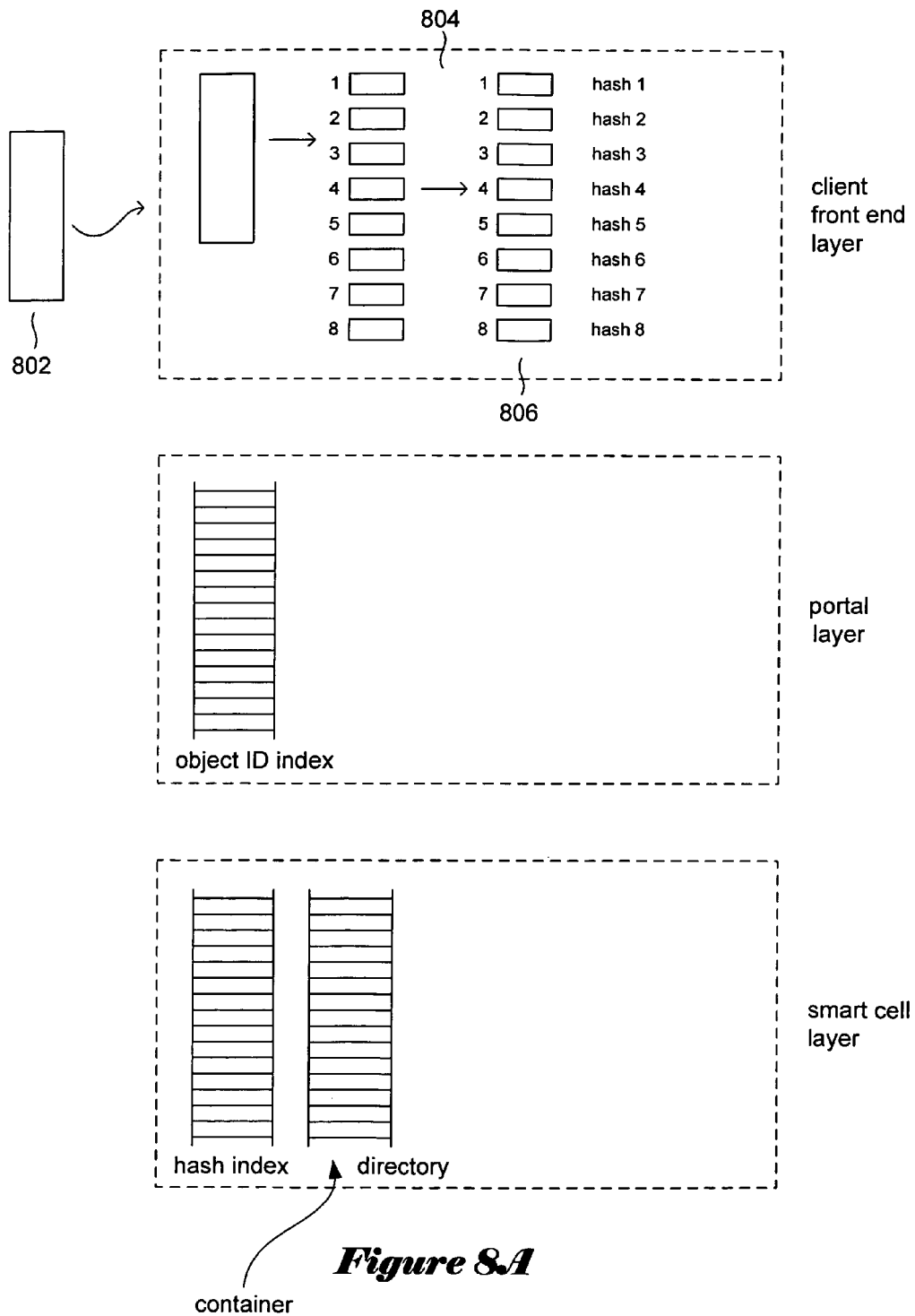
FIGS. 8A-I illustrate an exemplary data-object STORE operation that represents one embodiment of the present invention.
Figure 8B:
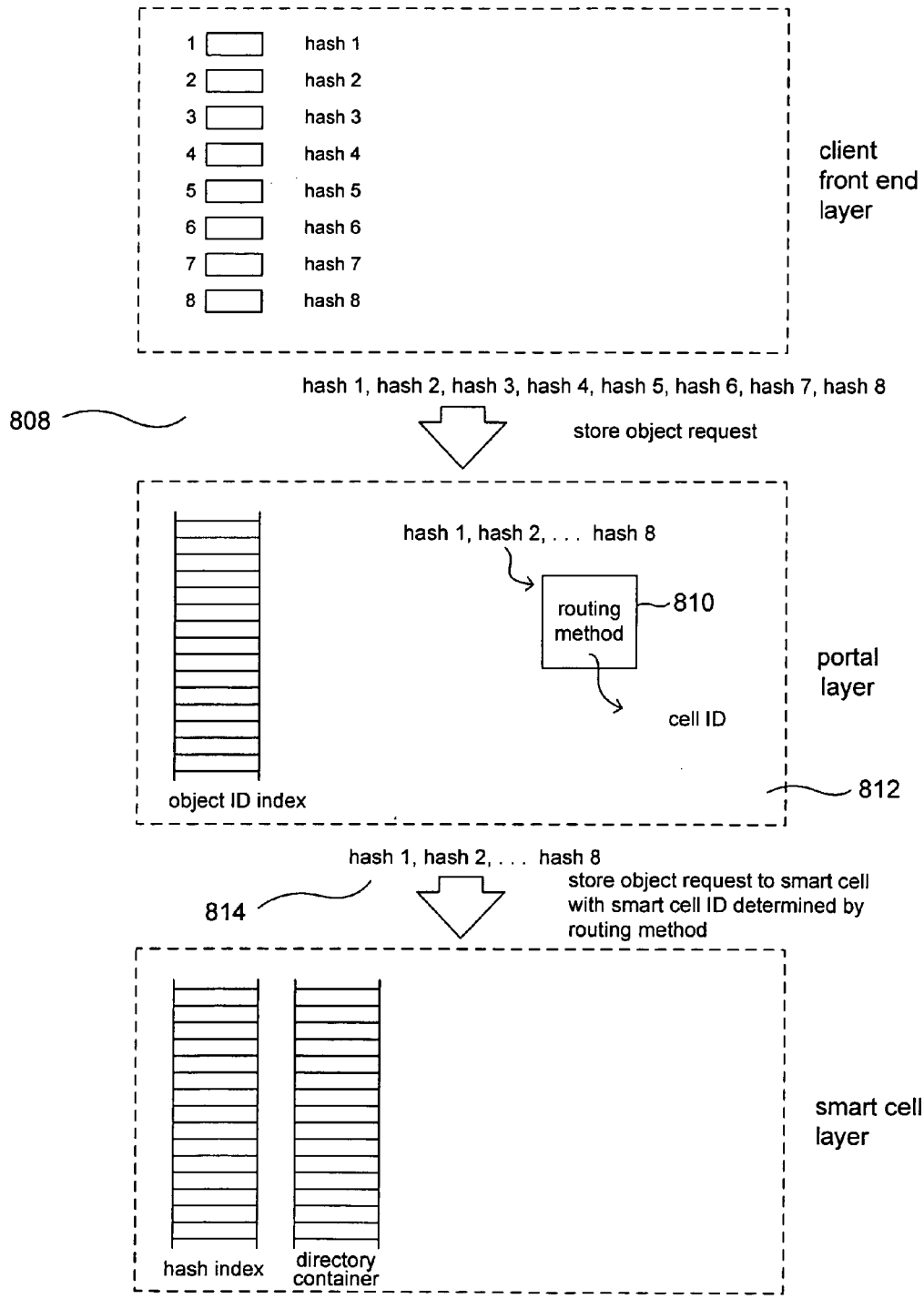

FIGS. 8A-I illustrate an exemplary data-object STORE operation that represents one embodiment of the present invention. It should be noted that, although steps in the STORE operation are shown sequentially, many of the steps may be executed in parallel, or concurrently in an overlapping fashion. Initially, as shown in FIG. 8A, a data object 802 is presented to the front-end application for the distributed, differential electronic-data backup and archiving system running on a client computer for storage by the backup and archiving system. The data object is partitioned into data chunks 804, and hash values are generated for each data chunk by applying a hash function to each of the data chunks 806. In addition, the hash values are sequentially ordered into a hash list by the client front-end application. Next, as shown in FIG. 8B, the front-end application running on the client computer transmits a STORE request to a portal 808, including in the STORE request the hash list generated initially by the front-end application. The portal inputs the hash list to a routing method 810 to generate a cell ID 812 for the cell on which the data object is to be stored. Many different types of routing methods may be employed. In one class of routing methods, the hash list contains sufficient information for routing the STORE request to a cell. In an alternative class of routing methods, the portal may transmit a few or more hash values from the hash list in information requests to cells in order to determine which of the cells would be the most appropriate target for storing the data object. For example, a cell already storing data chunks with corresponding hash values equal to the hash values transmitted by the portal in the information requests would be a good candidate for storing the new data object, since one goal of the distributed, differential electronic-data backup and archiving systems of the present invention is to collocate data objects that share data chunks within a single cell, when possible. In yet alternative embodiments, portals may maintain a portion of, or an entire, hash-value directory to facilitate routing of STORE requests. When the a cell is selected for storing the data object by the routing method, the portal forwards the STORE request received from the client to the selected cell 814.

There are at least three different possibilities that may obtain when the selected cell receives the STORE request: (1) the data object may already be stored in the cell, discussed below with reference to FIG. 8C; (2) a number of data chunks of the data object may already be stored in the selected cell as a result of storing other data objects in the cell, discussed below with reference to FIGS. 8D-F; and (3) no data chunks of the data object are currently stored in the cell, as discussed below with reference to FIGS. 8G-I.

Figure 8C:
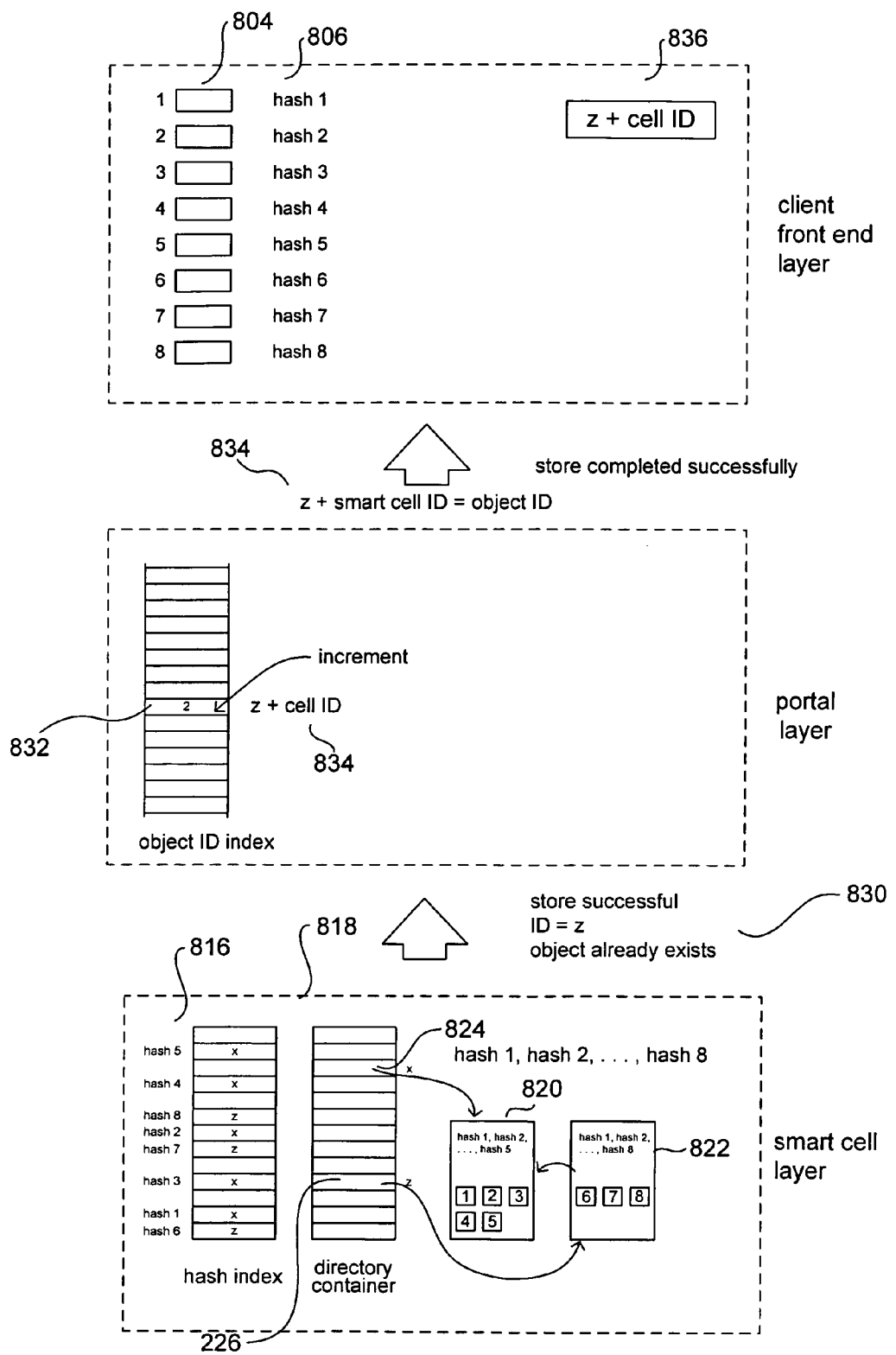

In all cases, the selected cell processes the received hash list by looking up each hash value in the hash-value index maintained by the cell in order to identify containers in which data chunks with corresponding hash values may be stored. For example, as shown in FIG. 8C, the eight hash values in the exemplary hash list received by the cell are matched with container IDs in the hash index 816, indicating that all of the data chunks identified by the eight hash values are already stored within containers in the cell. As seen in FIG. 8C, the data chunks identified by hash values hash1, hash2, hash3, hash4, and hash5 are associated in the hash-value index with container x, and the remaining hash values hash6, hash7, and hash8 are associated with container z. In certain embodiments, each cell keeps a container directory 818 in which the locations for containers identified by container IDs are stored. In such embodiments, the locations for container x 820 and container z 822 are found in entries 824 and 826 of the container directory, respectively, indexed by the container ID values x and z. In other embodiments, container IDs are paths to storage that are universal within a distributed, differential electronic-data storage system. In the case where a container contains a hash list identical to the hash list input with the STORE request, as in FIG. 8C, the data object furnished with the STORE request has already been stored. In certain embodiments, finding the data object already stored within the cell allows the cell to return a store successful result 830 to the portal. The portal may determine an object ID for the data object received in the STORE request by combining the container ID z with the cell ID of the cell that stores the object 834, and may then increase a counter 832 indexed by the object ID to indicate that a second copy of the data object identified by the object ID has been stored in the distributed, differential electronic-data backup and archival system as a result of execution of the STORE operation. Thus, in the above-described embodiment, the portal maintains an object-ID index that contains counts of the number of copies of objects indexed by object IDs. Finally, the portal returns the object ID and a SUCCESS return status to the client front end 834 to complete the STORE request operation. The client front-end application saves the returned object ID 836 and may subsequently deallocate the data chunk and hash information 804 and 806 generated in order to execute the STORE request. The object ID may subsequently be returned to client-computer routines or may be maintained by the client front-end application, in association with a higher-level object name, to allow the data object to later be retrieved by higher-level client routines that furnish the higher-level object name as part of a RETRIEVE request. In alternative embodiments, counts of data-object copies may be maintained by cells, rather than portals, and in still alternative embodiments, a separate container or container entry is allocated by cells for each copy of a data object.

Figure 8D:
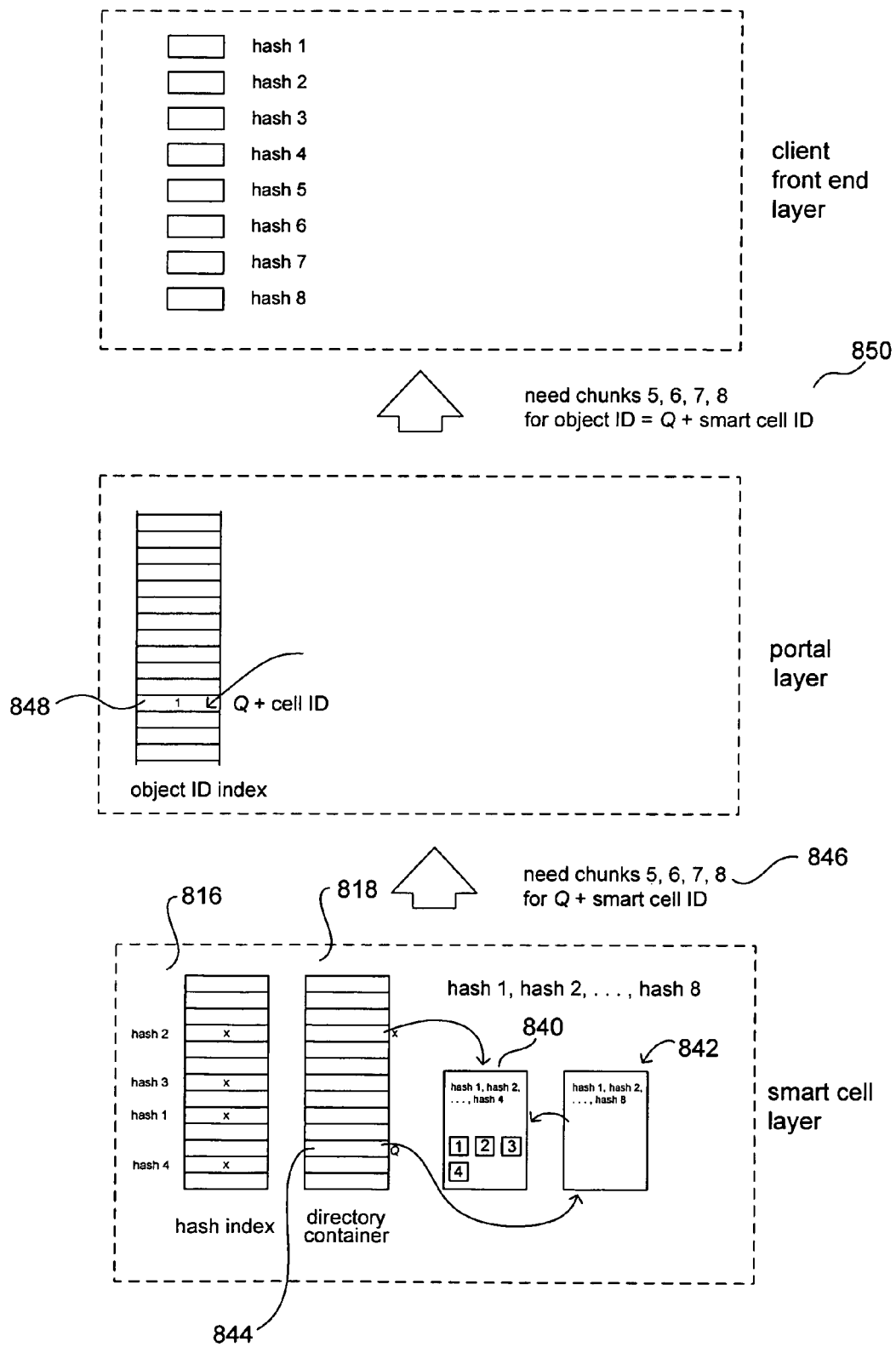
Figure 8E:
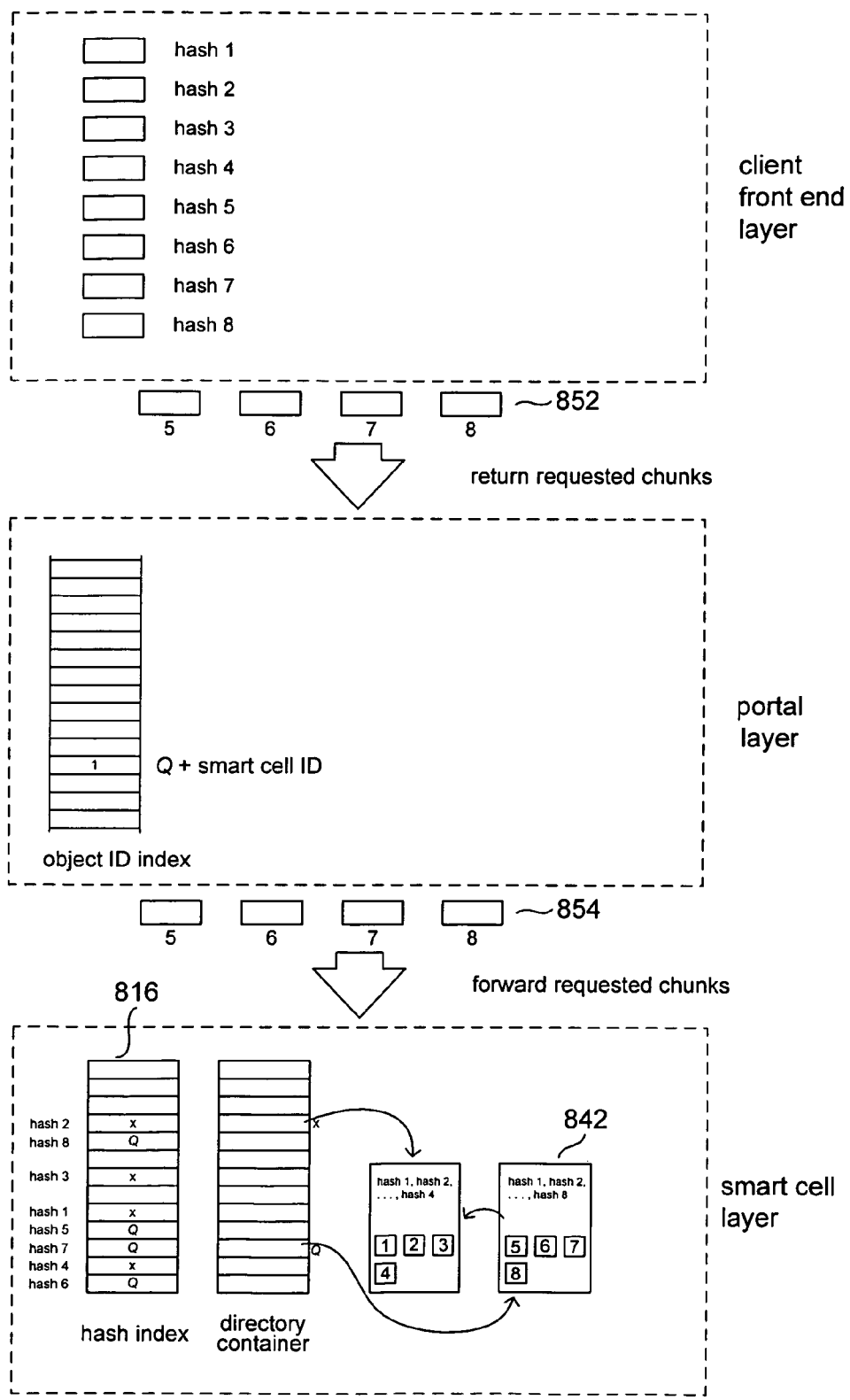
Figure 8F:
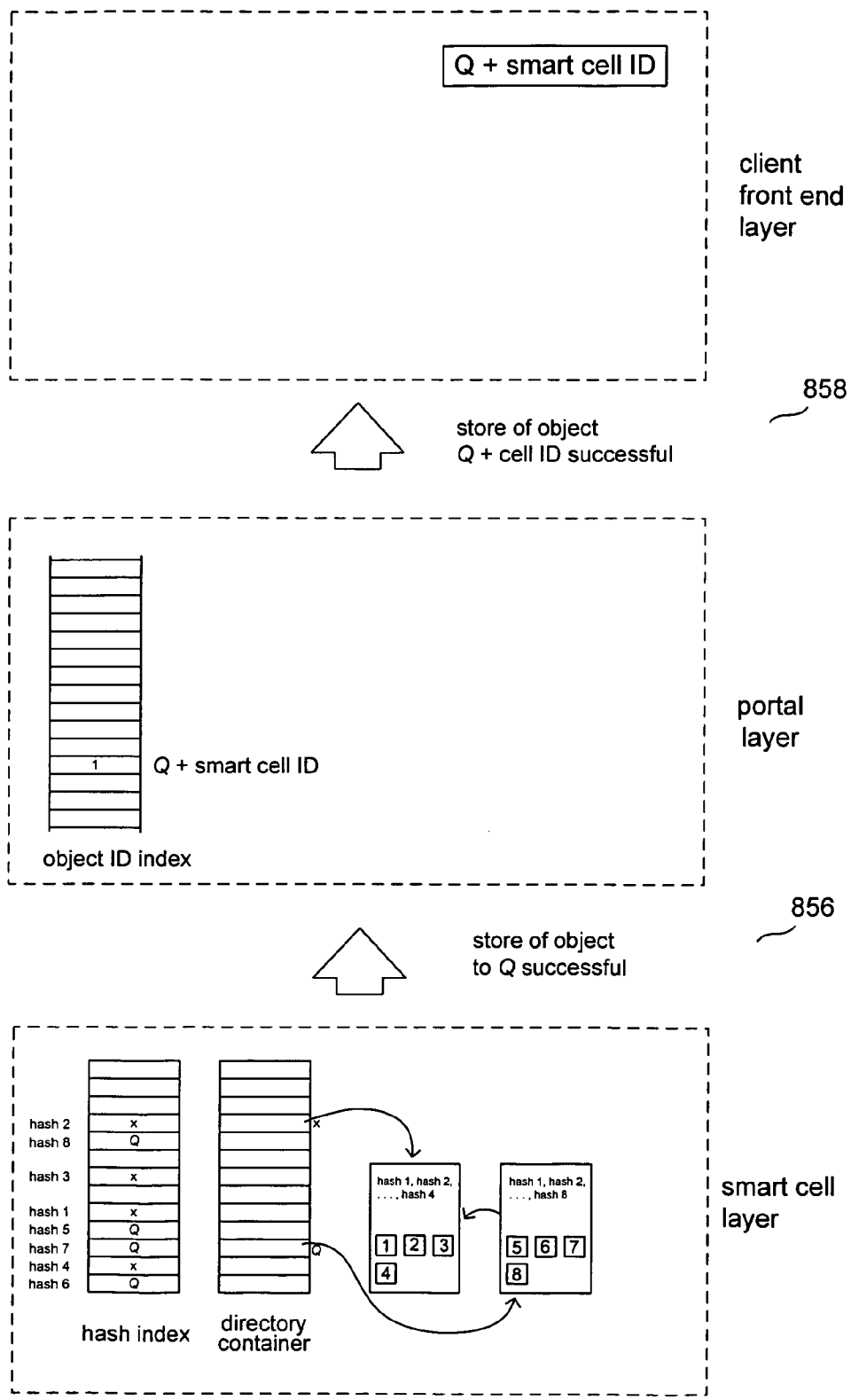

In a second case, illustrated in FIGS. 8D-F, only a portion of the chunks of the data object are already stored in a cell. As shown in FIG. 8D, the chunks associated with hash values hash1, hash2, hash3, and hash4 are found by the cell, using the hash-value index 816, to be stored in a container identified by the container ID x. Accessing the container directory 818, the cell determines the location for the container x 840 and then prepares a new container 842 for storing the data object as the target of the received STORE request. The received hash list is stored within the new container 842 which is assigned a container ID Q. The container ID directory is updated to contain an entry 844 indexed by the container ID Q specifying the location of the new container 842. The cell determines that the remaining data chunks 5-8 of the data object stored in the new container 842 need to be obtained from the client computer in order to complete the STORE operation. Therefore, the cell returns a request 846 for chunks 5-8 to the portal. The portal creates a new entry in the object ID index 848 to indicate that a data object, identified by an object ID comprising container ID Q combined with the cell ID of the selected cell, is now stored in the selected cell. The portal then forwards the chunk request 850 back to the client front-end application. As shown in FIG. 8E, upon receiving the chunk request, the client front-end application responds by forwarding the requested data chunks 852 back to the portal which, in turn, forwards the data chunks 854 to the selected cell. The selected cell then stores the received data chunks into the new container 842 and updates the hash-value index 816 to indicate that the unique data chunks identified by hash values hash5, hash6, hash7, and hash8 are now stored in container Q. Then, as shown in FIG. 8F, the cell returns an indication of a successful store of the data object 856 to the portal which, in turn, forwards the response 858 back to the client front-end application, along with the object ID for the stored object. The client front-end application then removes any remaining chunk and hash information generated to execute the STORE request, and stores the new object ID for either returning to client-computer programs or for subsequent access in order to retrieve the object at a later time.

Figure 8G:
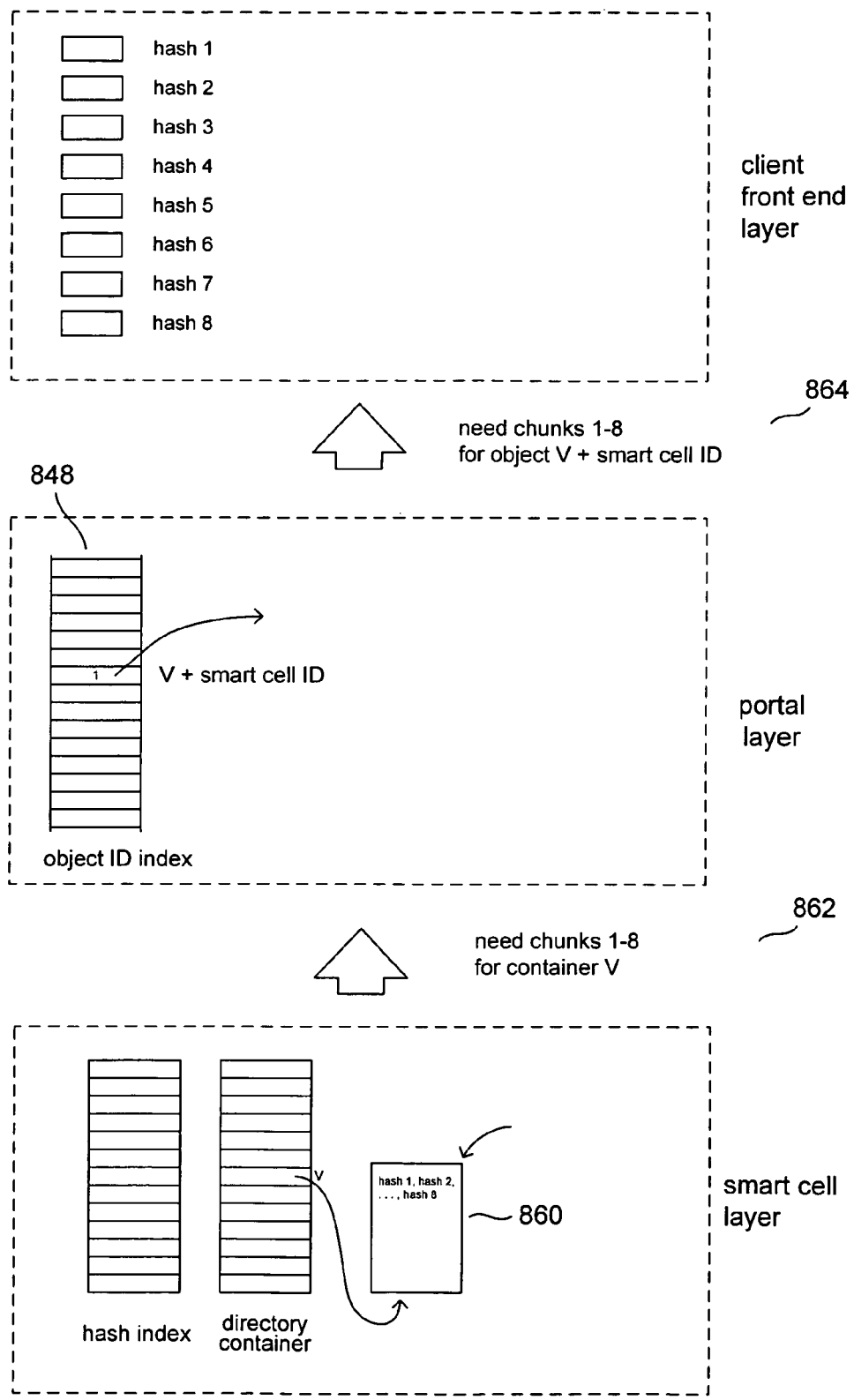
Figure 8H:
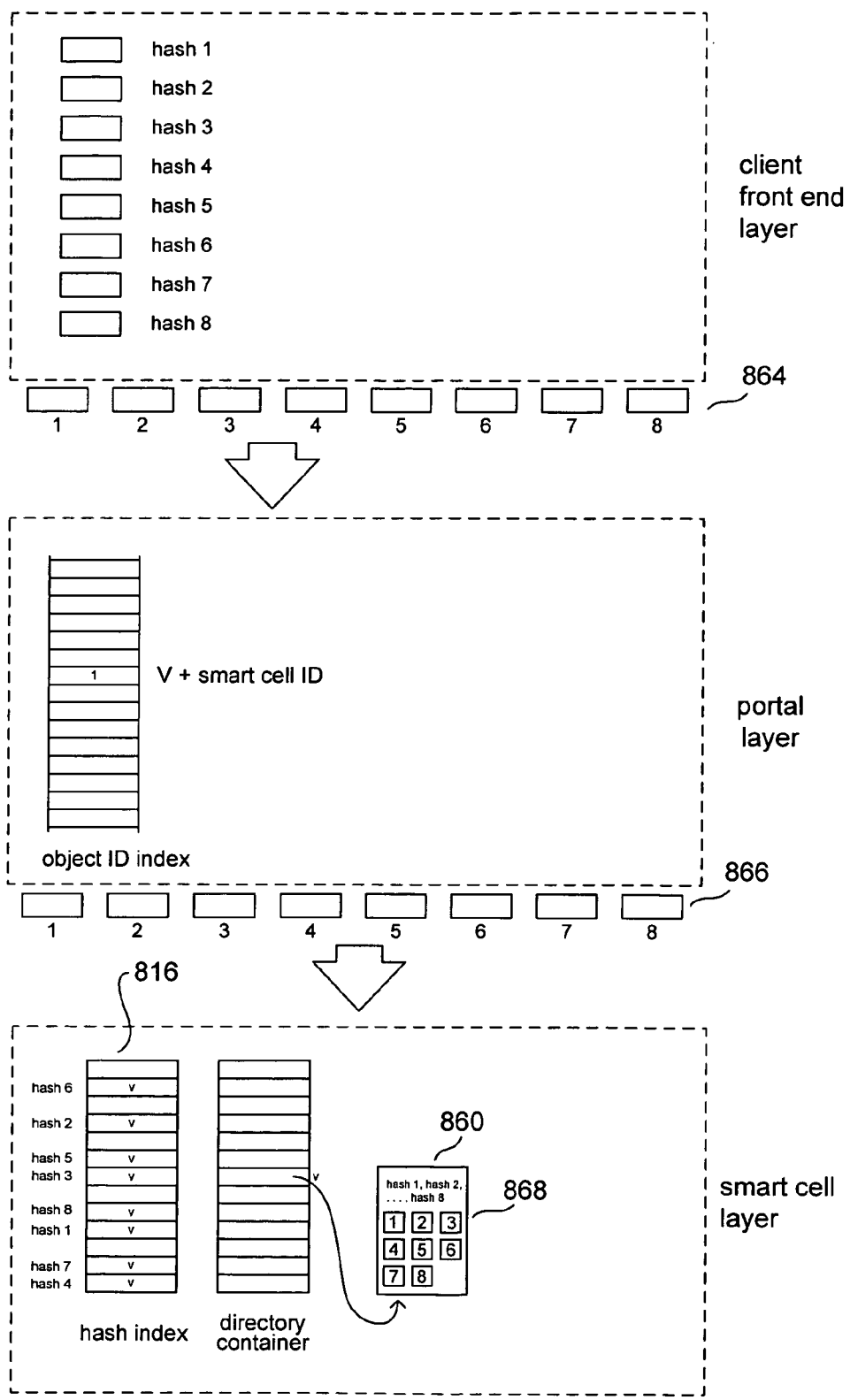
Figure 8I:
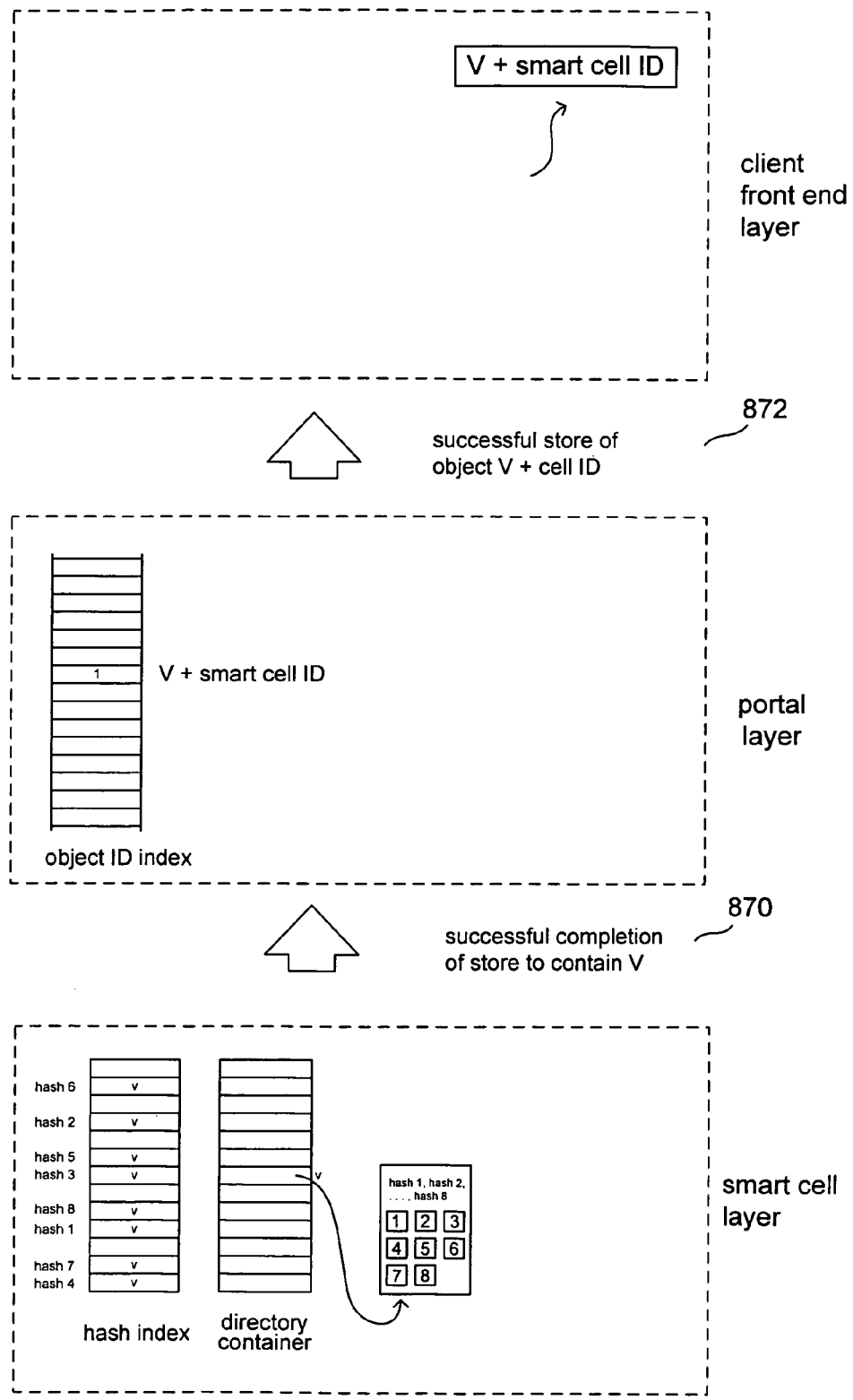

In a third case, as shown in FIG. 8G, the selected cell contains no data chunks corresponding to hash values in the received hash list. In this case, the cell allocates a new container 860 and returns a request for all of the data chunks 862 to the portal, which forwards the request back to the client computer 864 after updating the object ID index 848. As shown in FIG. 8H, the client forwards the requested chunks 864 back to the portal which, in turn, forwards the chunks 866 to the cell. The cell stores the requested chunks 868 within the new container 860 and then, as shown in FIG. 8I, returns a successful completion status 870 back to the portal which, in turn, forwards the successful completion object status along with the object ID 872 to the client front-end application.

As discussed above, there are many possible alternative embodiments that differently implement STORE and RETRIEVE operations and that that may use different partitioning of functionality between the client front-end applications, portals, and cells. For example, cells may directly return chunk requests to client computers, bypassing the portals, and client computers may respond with data chunks by transmitting the data chunks directly to cells in certain embodiments. As another example, object IDs may be full path names for containers or container entries, so that cells need not maintain a container ID directory. In yet additional embodiments, particularly when large data objects are stored, the requesting and transmitting of chunks may involve numerous round-trip transactions in which only a fixed-size, maximum number of data chunks are transmitted per transaction. For example, in one such embodiment, only 100 data chunks may be requested and transferred in one round-trip operation. Therefore, when a cell needs 1000 data chunks in order to store a data object, ten different 100-chunk round-trip transactions are carried out to transfer the needed data chunks from the client computer to the cell. Many other alternatives are possible, including certain more detailed embodiments discussed in the next subsection.

Figure 9:
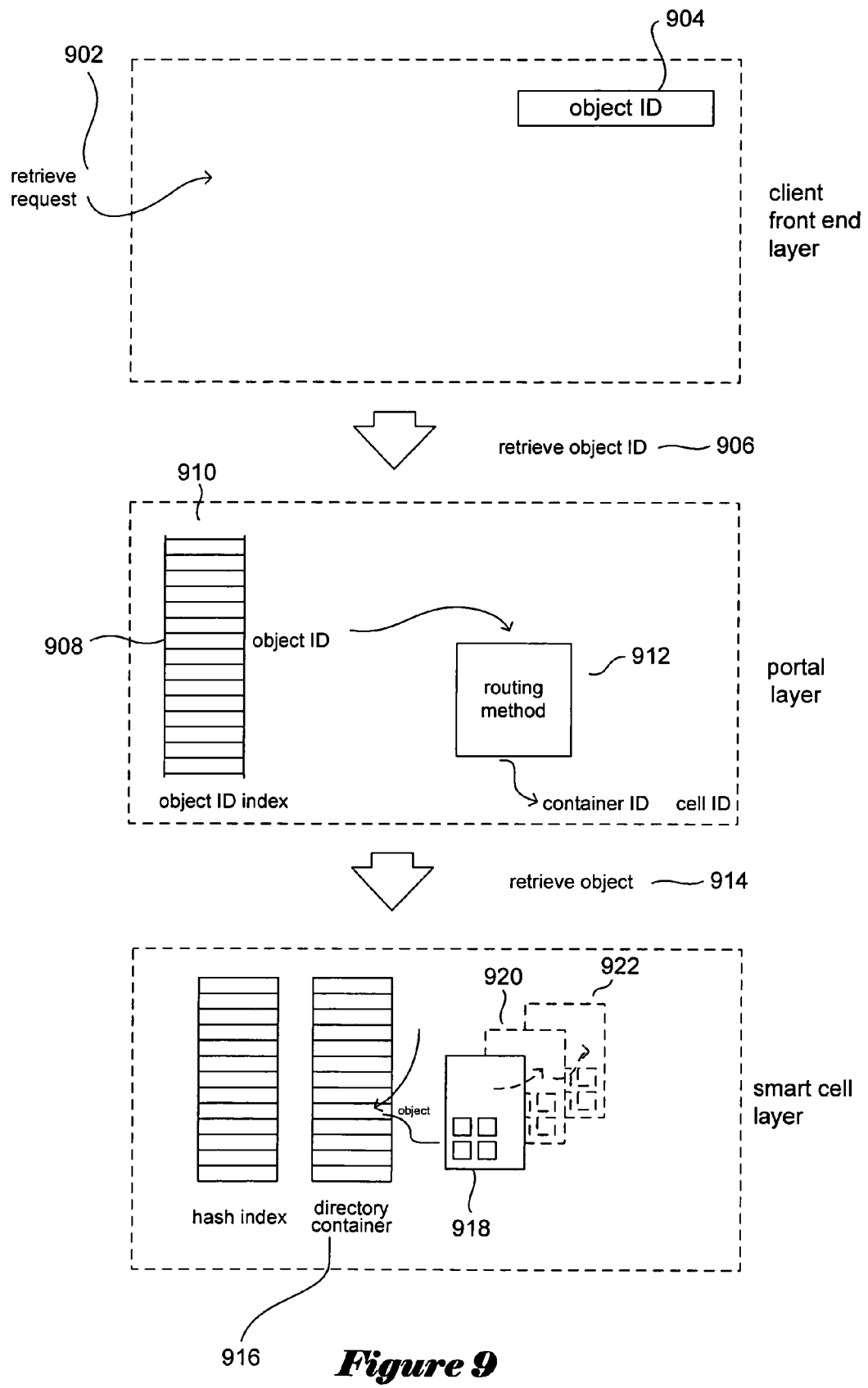
FIGS. 9-10 illustrate execution of an exemplary RETRIEVE request using the illustration conventions employed in FIGS. 8A-I according to an embodiment of the present invention.
Figure 10:
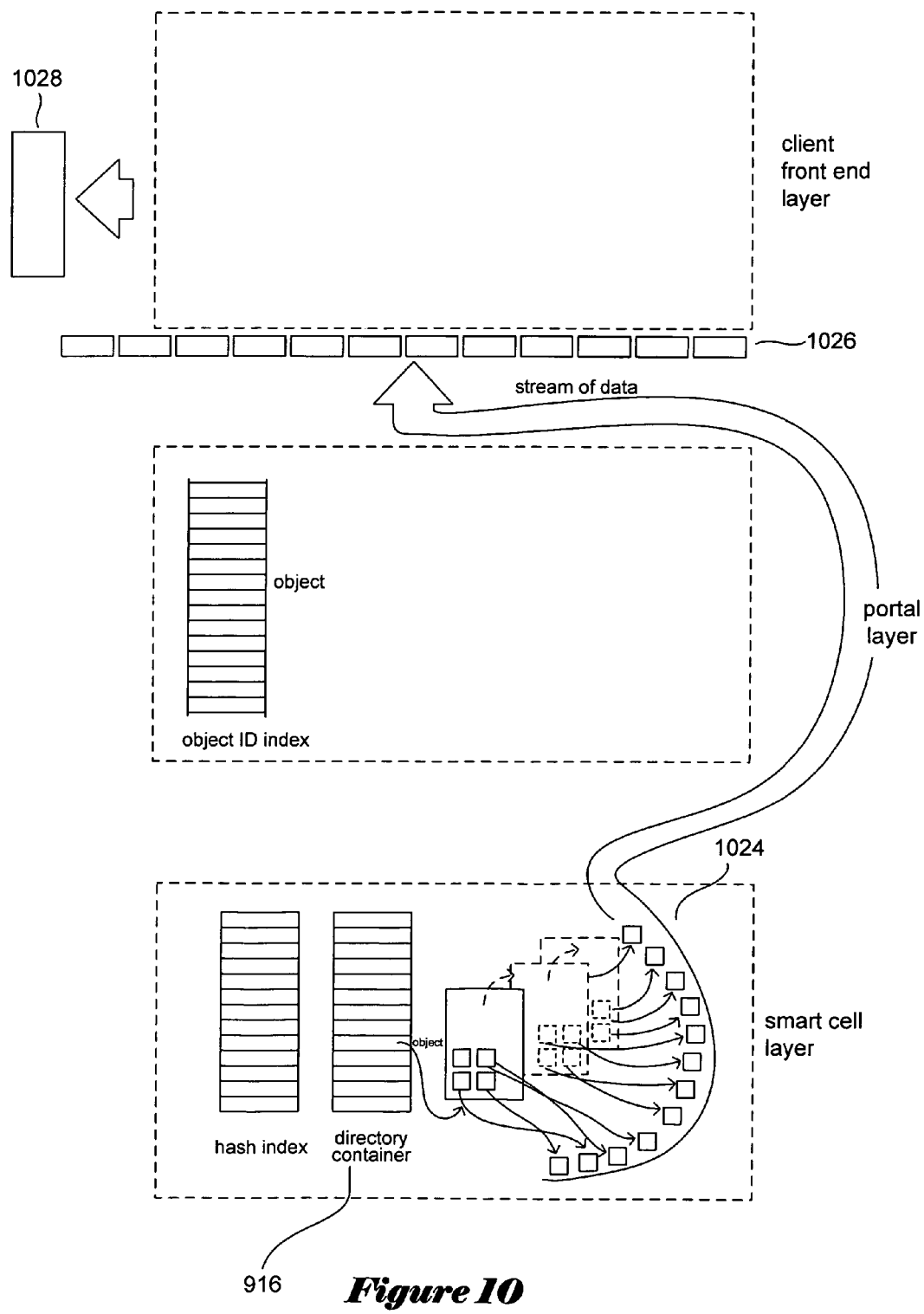

FIGS. 9-10 illustrate execution of an exemplary RETRIEVE request using the illustration conventions employed in FIGS. 8A-I according to an embodiment of the present invention. Initially the front-end application running on a client computer receives a data-object-RETRIEVE request 902 and uses the object ID for the data object included in the RETRIEVE request, or uses a higher-level description of the data object to find a stored object ID for the object 904, in order to construct a RETRIEVE request that is transmitted 906 by the client front-end application to a portal. The portal uses the included object ID to locate an entry for the data object 908 in the object ID directory 910 in order to ascertain whether the object has been stored within the distributed, differential electronic-data backup and archiving system. If so, the object ID is input to a routing method which parses the object ID to determine a container ID and cell ID 912 for the object. The portal then directs a RETRIEVE object request 914 to the identified cell. The cell uses the container ID to access the container directory 916 in order to determine the location for the container 918. Locating the container for the object 918, the cell can use data chunks contained within that container, as well as data chunks stored in containers 920 and 922 referenced from that container 918, in order to retrieve all data chunks for the stored object. Then, in the described embodiment, as shown in FIG. 10, the cell can direct the data chunks 1024 directly back to the client front-end application as a stream of data chunks 1026. The client front-end application can then reconstruct the data object 928 from the stream of data chunks and return the reconstructed data object to a higher-level client routine or program. Alternatively, the retrieved objects may be returned as a stream of bytes or chunks. The RETRIEVE operation illustrated in FIGS. 9-10 is exemplary of RETRIEVE operations that represent embodiments of the present invention. The RETRIEVE operation is efficient in time, processing cycles, latency, and in other aspects of RETRIEVE request execution. Because all of the data chunks are stored within a single cell, inter-cell messages are not needed in order to assemble the data object. In the described embodiment, data chunks are returned directly to a requesting client, bypassing the portal and eliminating chunk-forwarding overhead. In alternative embodiments, the chunks may be sent through a portal. In yet alternative embodiments, only particular chunks of an object may be specified for retrieval and returned by a RETRIEVE operation.

Detailed Embodiment of the Present Invention

Figure 11:
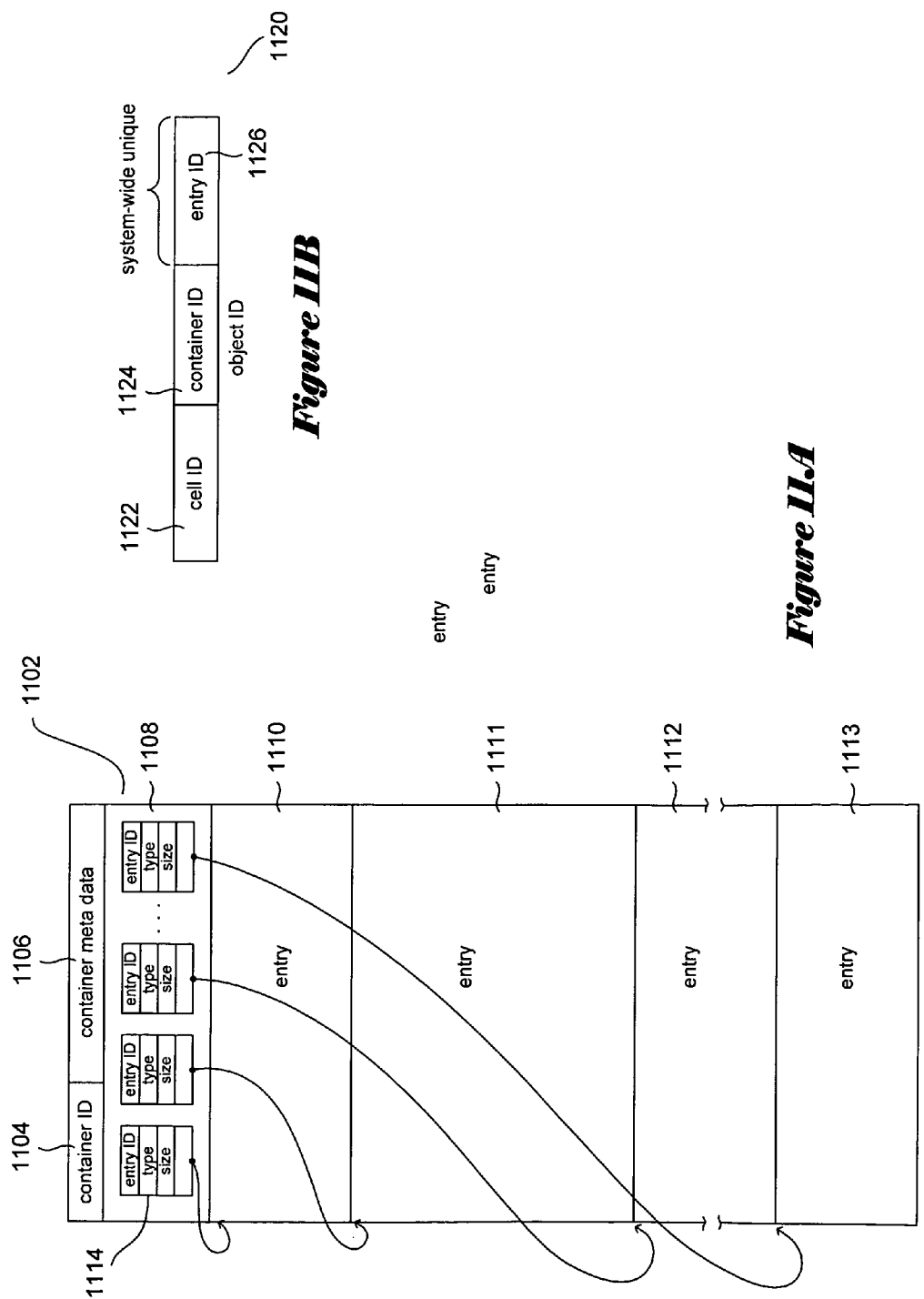
FIGS. 11A-B illustrate the container object in which data chunks and data objects are stored by cells of a distributed, differential electronic-data backup and archiving system that represents an embodiment of the present invention and the object IDs used to identify data objects stored within the backup and archiving system.

FIG. 11A illustrates the container object in which data chunks and data objects are stored by cells of a distributed, differential electronic-data backup and archiving system that represents an embodiment of the present invention. The container object 1102 includes a container ID field 1104, additional container metadata 1106, an entry list or entry directory 1108, and a number of entries 1110-1113. Various different implementations of the present invention employ container ID fields of different lengths. The length of the container ID needs to be sufficient to uniquely identify all containers stored within all cells of a distributed, differential electronic-data backup and archiving system. Container metadata may include a variety of different types of additional data related to a container. Container metadata may include the current size of the container, a maximum size of the container, a pointer to the next free entry of, or the first byte following the last current entry in, the container, an indication of the number of entries in the container, and other such data. The entry list or entry directory 1108 is an ordered sequence of entry-list nodes, such as entry list node 1114, that specify all of the entries currently contained in the container. In many embodiments, the entry list is not stored as a separate list within a container object, but is instead assembled in memory when the container object is accessed. Each entry-list node may include an entry ID by which the entry is identified, an entry type indication, an indication of the size of the entry, and a pointer, or reference, to the beginning of the entry. In various embodiments of the present invention, a variety of different types of entries may be stored within containers. Entry types include chunked-object entries, which correspond to data objects stored within the distributed, differential electronic-data backup and archiving system, entries that store unique data chunks, entries that stored unchunked data objects, entries that store revision histories, and many other types of entries.

FIG. 11B shows details of an object ID created to identify each data object stored in the distributed, differential electronic-data backup and archiving system that represents one embodiment of the present invention. In this embodiment of the object ID, the object ID 1120 comprises a concatenation of the cell ID 1122 of the cell that stores the object, the container ID 1124 of the container in which the chunked-object entry, for chunked objects, or unchunked object entry, for unchunked objects, is stored, and the entry ID 1126 that identifies the chunked-object entry or unchunked object entry within the container in which the hash list for the chunked object, or unchunked object, respectively, is stored. In the described embodiment of the present invention, the entry ID 1126 is unique with respect to the entire distributed, differential electronic-data backup and archiving system. In this embodiment of the present invention, an object can be located using only the entry ID for the chunked-object entry or unchunked-object entry corresponding to the data object. However, the longer object ID 1120 shown in FIG. 11B is used in order to efficiently locate data objects without the need for querying multiple cells within the backup and archiving system to locate an entry.

Figure 12:
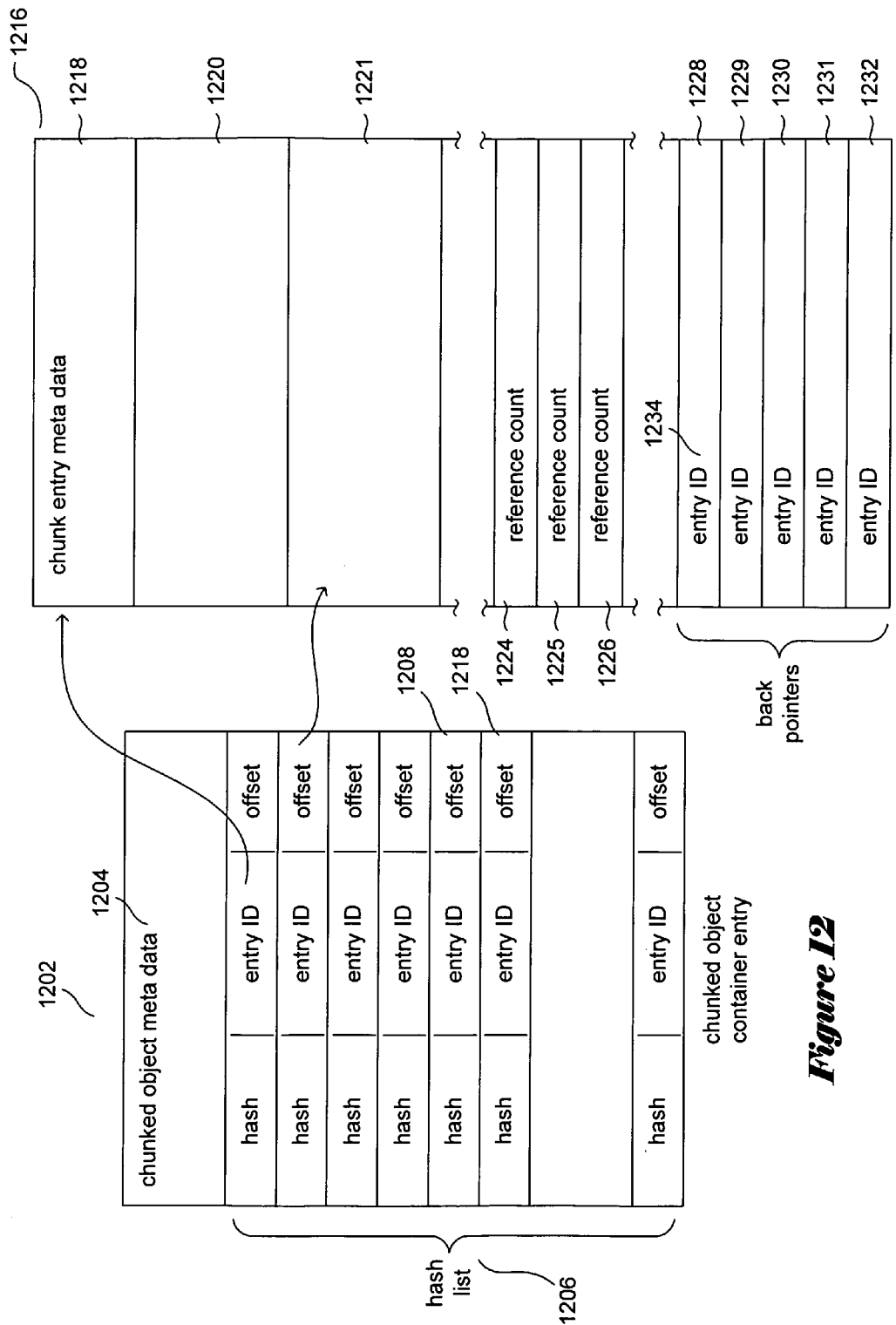
FIG. 12 illustrates the two types of entries used to store a chunked object in one embodiment of the present invention.

FIG. 12 illustrates the two types of entries used to store a chunked object in one embodiment of the present invention. A chunked-object entry 1202 is used to store various metadata associated with the object 1204 and a hash list 1206 that describes the data chunks contained in the object, the hash list sequentially ordered in the order of occurrence of the data chunks within the data object. Each entry in the hash list, such as entry 1208, stores the hash value 1210 associated with the data chunk, the entry ID 1212 of the chunk entry in which the data chunk is stored, and an offset 1214 within that chunk entry at which the data chunk is stored. A data-chunk entry 1216 includes metadata associated with the data-chunk entry 1218, a number of stored data chunks 1220-1221, a list of reference counts 1224-1226 for each of the data chunks stored in the data-chunk entry 1216, and a list of back pointers 1228-1231 to chunked-object entries that reference data-chunk entries stored within the chunk entry. Each back pointer, such as back pointer 1228, includes the entry ID 1234 of the chunked-object entry that references a data chunk within the chunk entry 1216. The back pointers are useful during deletion of chunk entries. When all of the reference counts within a chunk entry are zero, the chunk entry may be deleted during cleanup operations carried out by cells to remove deleted data objects and compact those objects that remain stored in a cell. Without back pointers, data-object deletion may involve extremely computationally intensive searching operations. In the described embodiment of the present invention, data chunks are not deleted from chunk entries. Deletion is carried out at the chunk-entry granularity.

Figure 13:
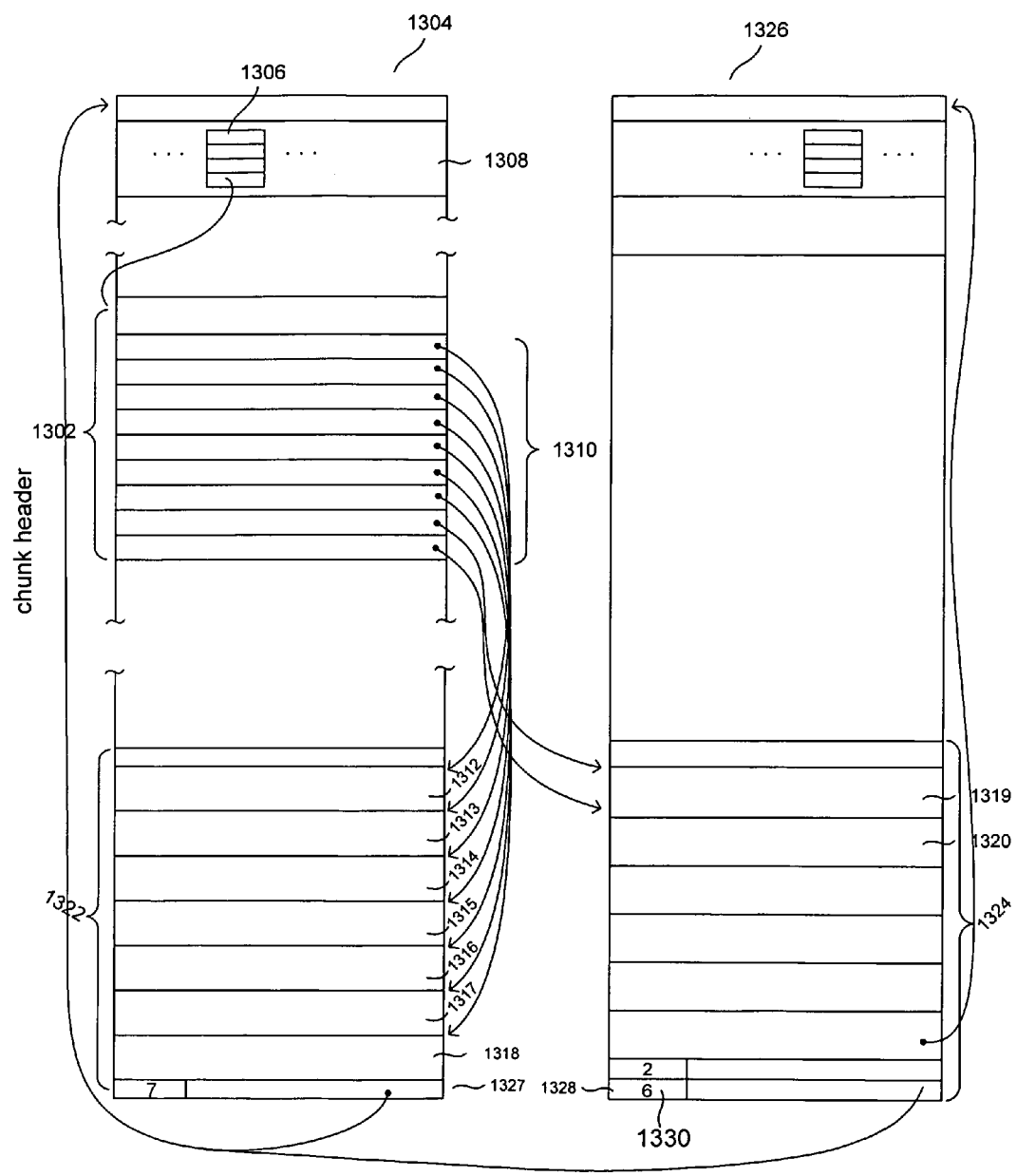
FIG. 13 illustrates storage of a nine-chunk data object within container objects of a cell according to one embodiment of the present invention.

FIG. 13 illustrates storage of a nine-chunk data object within container objects of a cell according to one embodiment of the present invention. The data object is represented by a chunked-object entry 1302, or chunk header, contained within a container 1304. The chunked-object entry 1302 is referenced by an entry node 1306 within the entry list 1308 of the container 1304. The chunk-object entry 1302 includes a hash list 1310, each entry of which references a data chunk 1312-1320. Seven of the chunks are stored in a chunk entry 1322 contained in the same container as the data-object entry 1302, namely container 1304. Two of the chunks 1319-1320 are stored in a second chunk entry 1324 stored in a second container 1326 within the same cell of the distributed, differential electronic-data backup and archiving system. The second container 1326 includes a back pointer 1328 that references the first container 1304, and that includes a reference count 1330 with value 2 indicating that two references are made to data chunks within the data entry 1324 from the container 1304. The container 1304 includes a back pointer 1332 indicating that seven references are made to data chunks within chunk entry 1322 by chunked-data entries contained within the container 1304.

Figure 14:
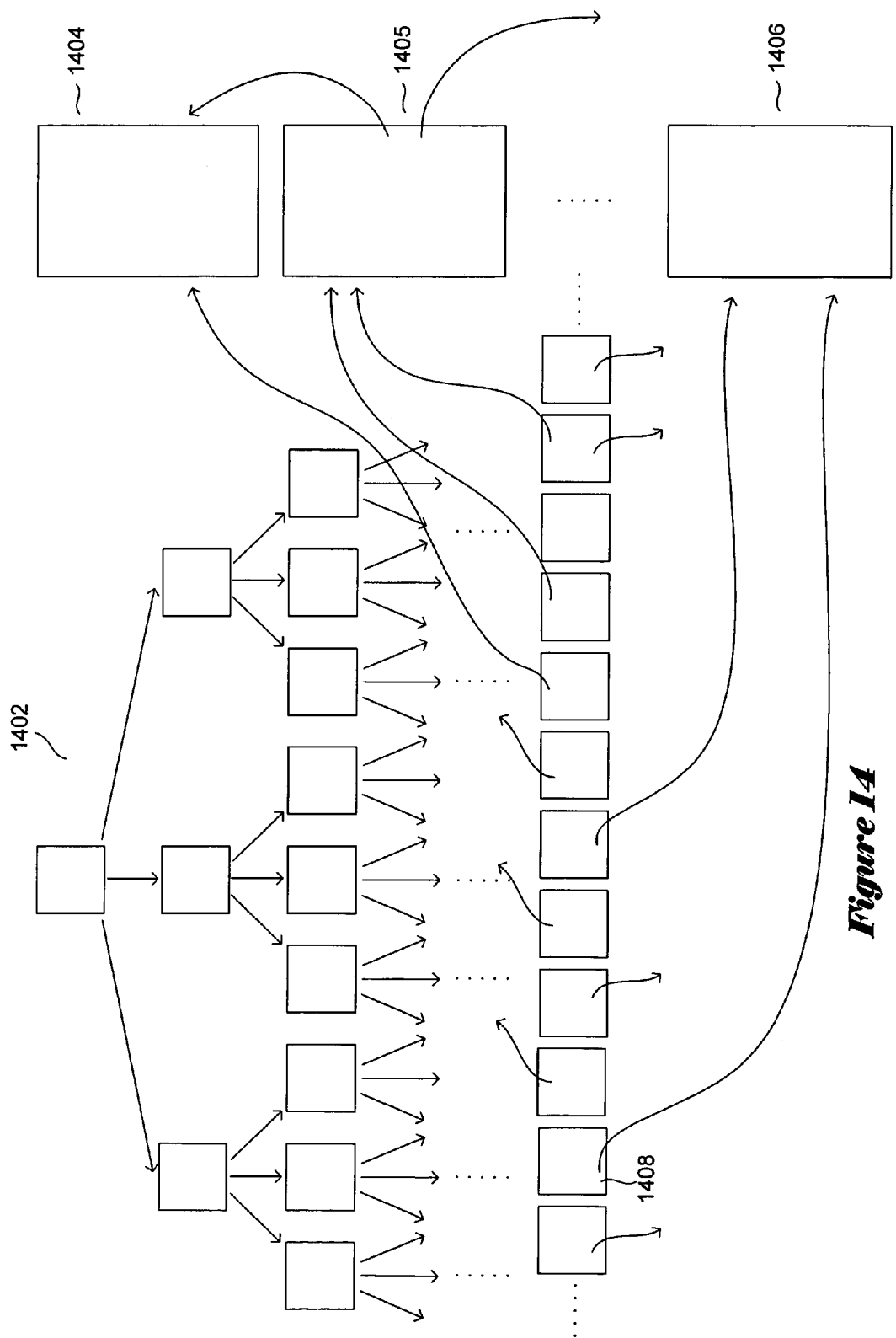
FIG. 14 illustrates the data objects stored within cells of the distributed, differential electronic-data backup and archiving system that represents one embodiment of the present invention.

FIG. 14 illustrates the data objects stored within cells of the distributed, differential electronic-data backup and archiving system that represents one embodiment of the present invention. Each cell contains a sparse hash-value index or directory 1402 and a number of containers 1404-1406. As discussed above, each of the containers 1404-1406 include multiple entries of various types. A sparse hash-value index 1402 is used to efficiently store all hash values for which corresponding data chunks are stored within the cell. Leaf nodes of the sparse hash-value index, such as leaf node 1408, include references to chunk-object entries within the containers that, in turn, reference data chunks corresponding to the hash values represented by the leaf nodes. In one embodiment of the present invention, when a container is accessed, a full directory of the contents of the container is prepared, to facilitate access to individual entries and data chunks. In certain embodiments of the present invention, the leaf nodes of the sparse hash-value index may contain container IDs, rather than references to entries or data chunks, and the directories for the containers may be accessed to locate the data chunk corresponding to the hash value stored in the leaf node.

FIGS. 15A-E illustrate execution of a chunked-object STORE request in the distributed, differential electronic-data backup and archiving system that employs the container objects and other data structures described with reference to FIGS. 11A-14 and that represents one embodiment of the present invention. Each of FIGS. 15A-E, and FIGS. 16A-B that follow, are divided into three columns corresponding to the client-resident front-end application layer, the portal layer, and the cell layer of an exemplary distributed, differential electronic-data backup and archiving system that represents an embodiment of the present invention. In this way, steps of the execution of the STORE request can be spatially located in the column corresponding to the layer of the backup and archiving system in which the steps are carried out.

Figure 15A:
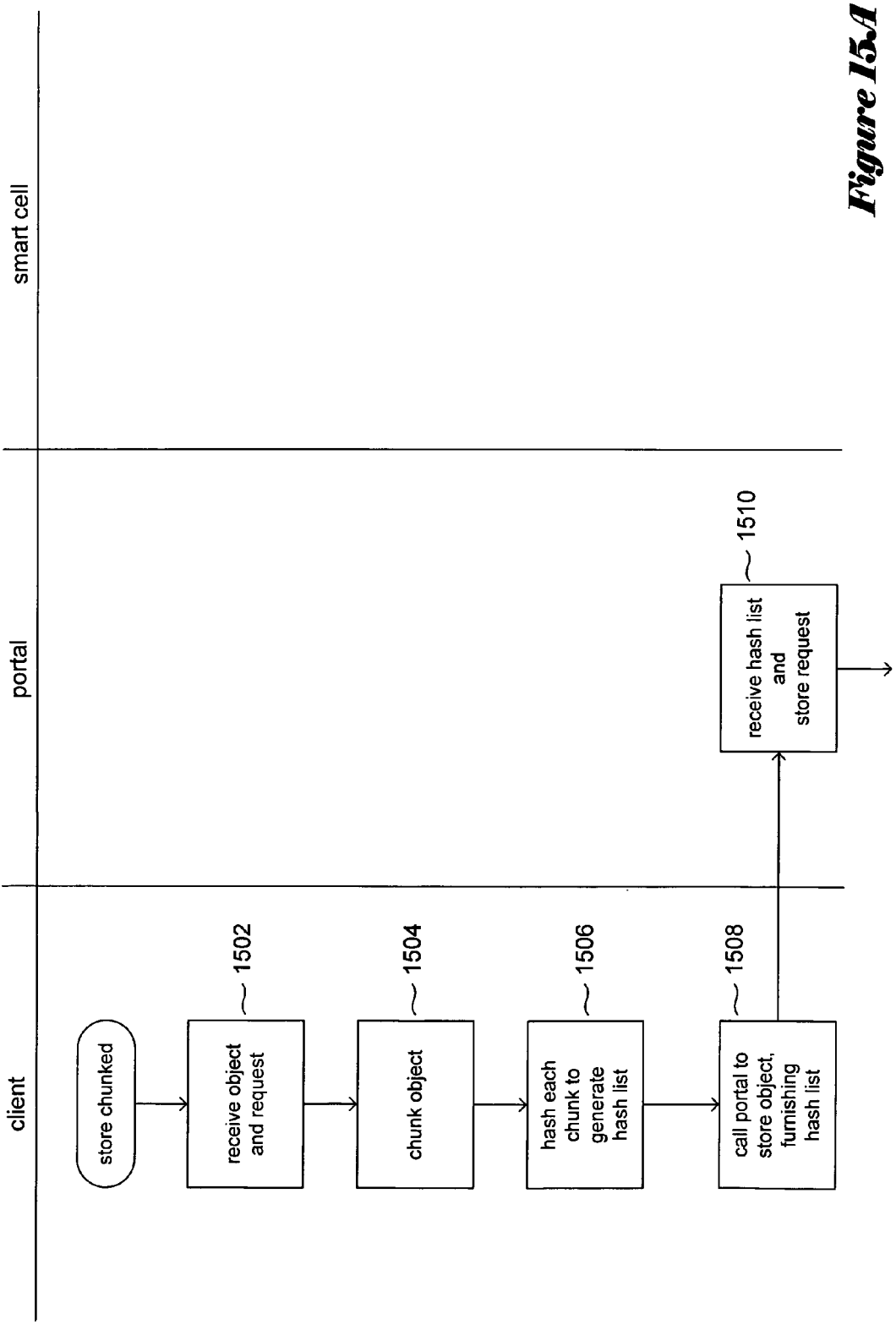
FIGS. 15A-E illustrate execution of a chunked-object STORE request in the distributed, differential electronic-data backup and archiving system that employs the container objects and other data structures described with reference to FIGS. 11A-14 and that represents one embodiment of the present invention.
Figure 15B:
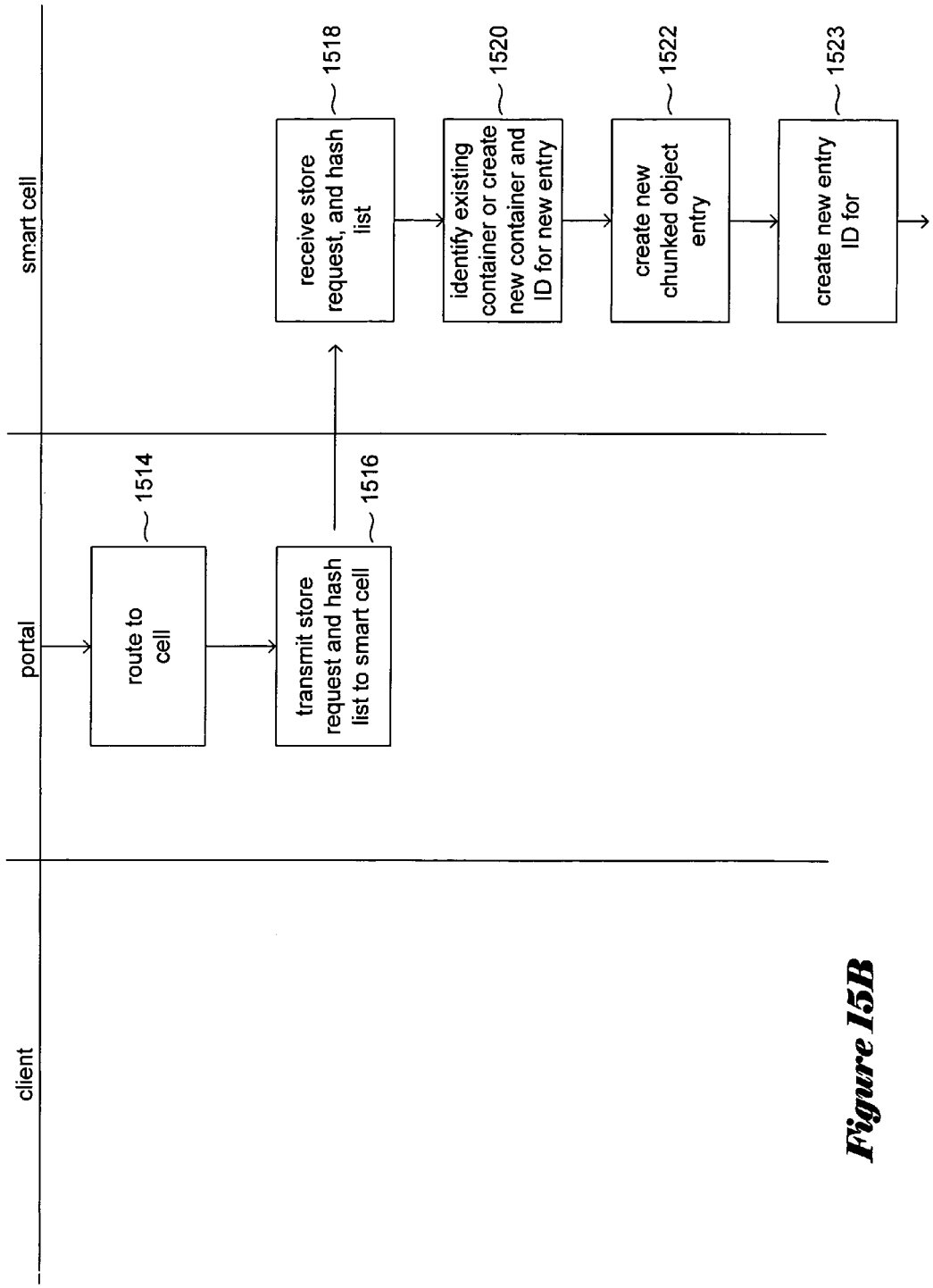

As shown in FIG. 15A, a STORE request begins with receiving a data object and a request for storing the data object by the front-end application from higher-level routines within a client computer in step 1502. The front-end application chunks the object, in step 1504, and generates hash values for each chunk in order to, in turn, generate a hash list that describes the data object in step 1506. In step 1508, the front-end application prepares a STORE chunk-data-object request and transmits the request, along with the generated hash list, to a portal. In step 1510, the portal receives the STORE chunked-data-object request and hash list. Continuing in FIG. 15B, the portal then routes the STORE request to the appropriate cell within the backup and archiving system in step 1514, forwarding the STORE request to the selected cell in step 1516. The selected cell receives the STORE request and hash list for the data object in step 1518. The cell then identifies an existing container or creates a new container for containing the chunked-object entry and a new container ID for the new container in step 1520. In step 1522, the cell creates a new chunked-object entry within the container selected or created in step 1520, and enters the received hash list into the newly created chunked-object entry. Continuing in FIG. 15C, the cell then determines, in step 1524, which hashes in the received hash list correspond to data chunks already stored within the cell by accessing the hash-value index maintained by the cell. In step 1526, the cell enters references to the existing data chunks into the chunked-object entry, appropriately creating or updating backpointers in containers that store the data chunks.

Figure 15C:
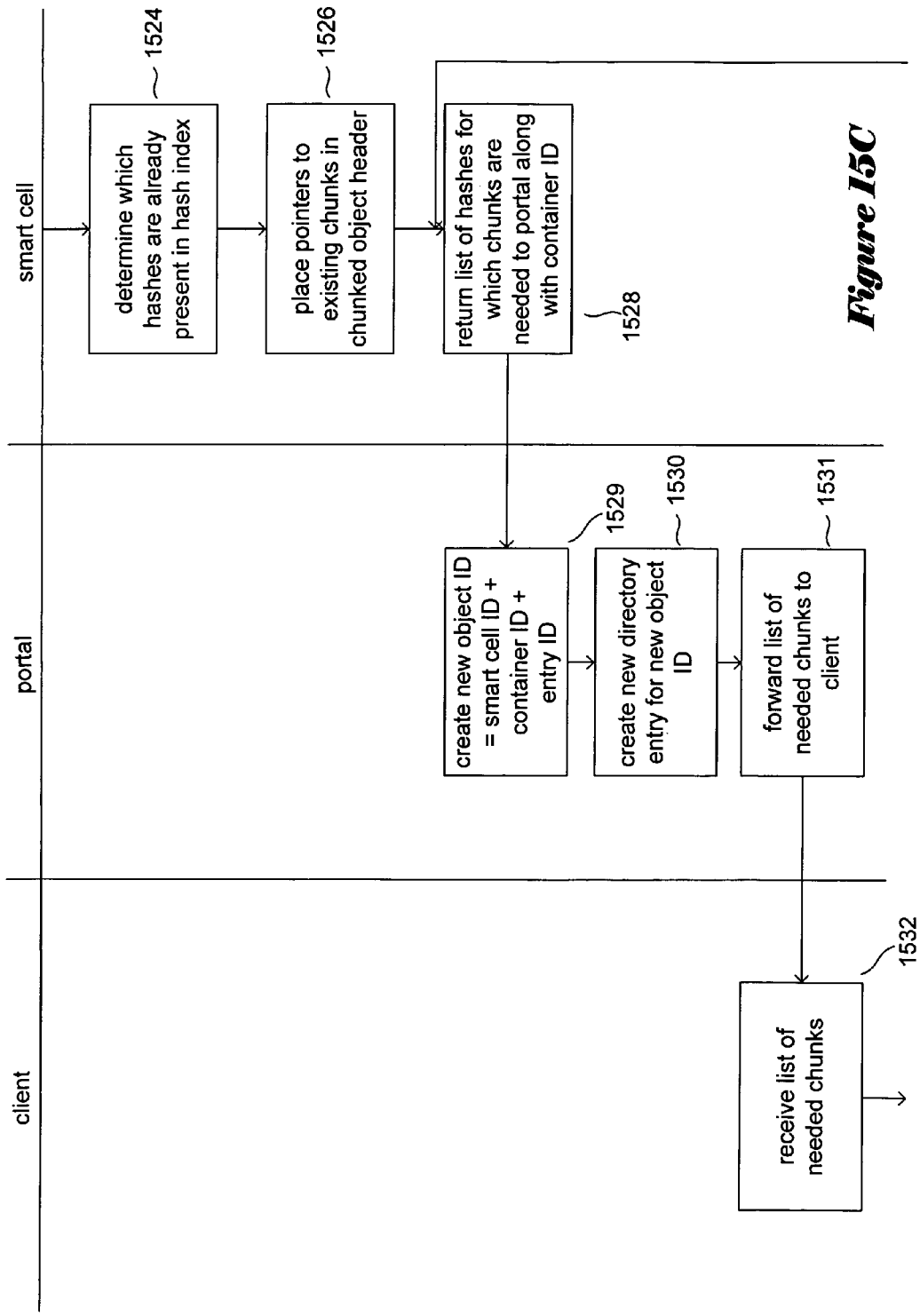
Figure 15D:
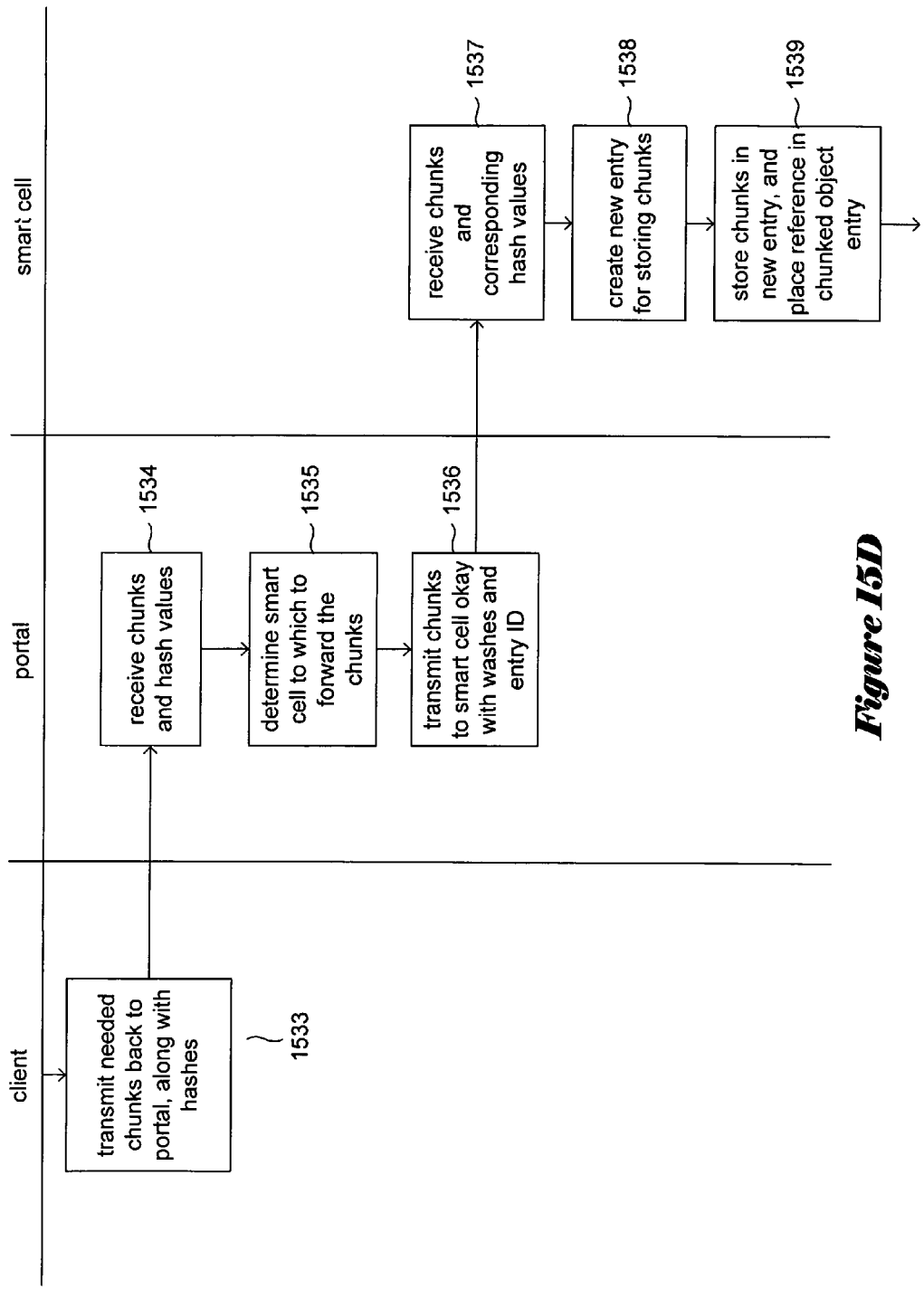
Figure 15E:
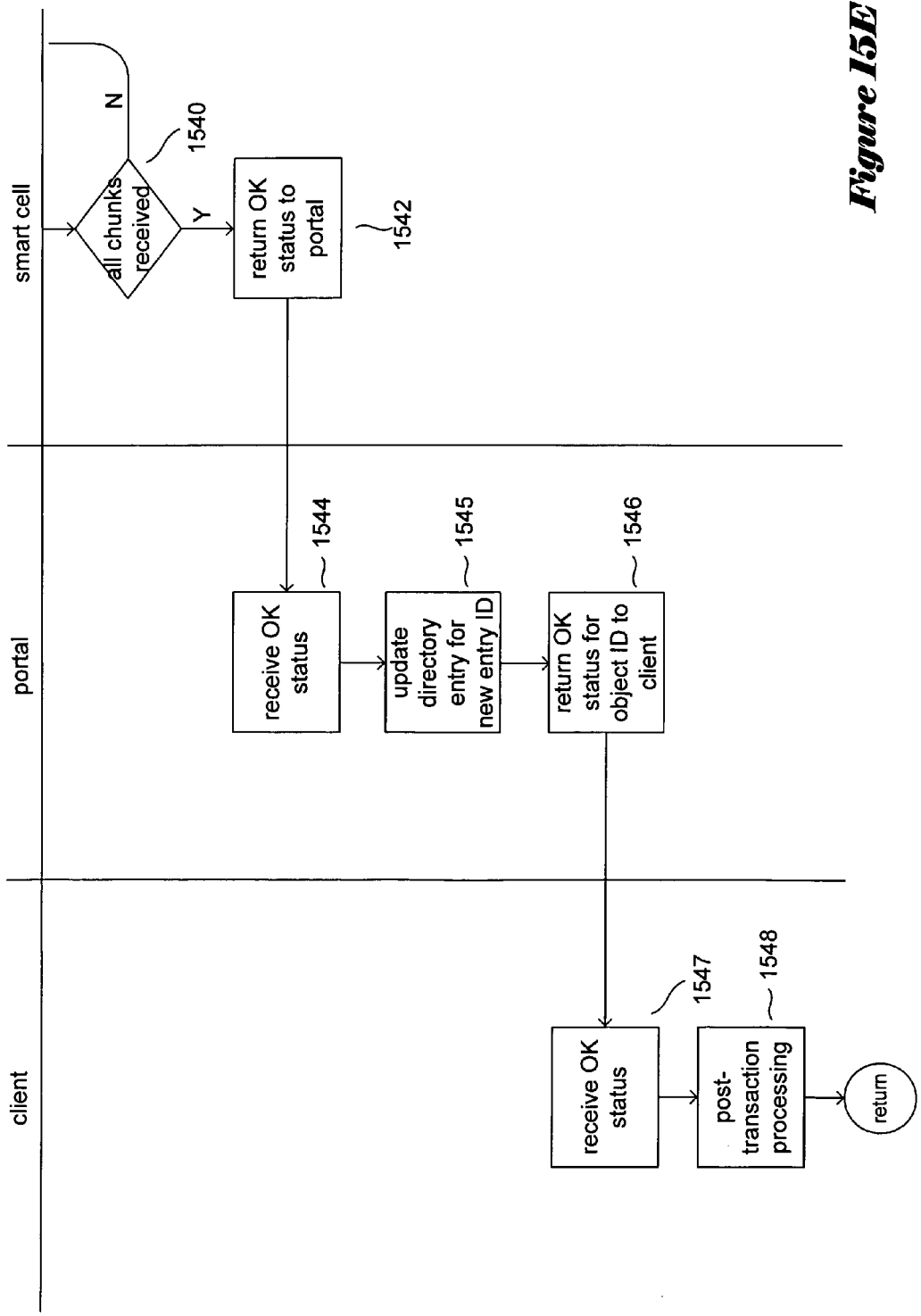

Next in a while-loop including steps 1528-1540 of FIGS. 15C-E, any chunks not yet stored within the cell are requested by the cell from the client and returned by the client to the cell in order to complete storage of the data object. In step 1528, the cell returns a list of hashes for which chunks are needed to the portal, along with the container ID for the container in which the data object is stored. In step 1529, the portal creates a new object ID (1120 in FIG. 11B) using the ID of the cell in which the object is stored, the container ID returned by the cell, and the entry ID. In step 1530, the portal creates a new directory entry for the new object ID to be stored within an object index maintained by the portal. Finally, in step 1531, the portal forwards the list of needed chunks to the client. In step 1532 the client receives the list of needed chunks and, in step 1533, returns the needed chunks, along with hashes corresponding to the chunks, to the portal. The portal receives the chunks and hashes in step 1534, determines which cell to which to forward the chunks in step 1535, and transmits the chunks received from the client to the cell, along with the hashes and entry ID for the chunked-object entry corresponding to the data object in step 1536. In step 1537, the cell receives the chunks and corresponding hashes. In step 1538, the cell creates a new chunk entry for the chunks in either the container in which the chunked-object entry was created or in another container, and, in step 1539, stores the received chunks in the new chunk entry, appropriately creating or updating references in the chunk entry to the chunk-object entry describing the data object. If all data chunks with a data object have not yet been received, as determined in step 1540, then control flows back to step 1528 for another round of data-chunk requesting and data-chunk storage. Otherwise, an OK status is returned by the cell to the portal in step 1542.

In step 1544, the portal receives the OK status, updates the directory entry for the stored object in step 1545, and returns an OK status and the new object ID to the client in step 1546. In step 1547, the client receives the OK status and carries out any post-transaction processing associated with execution of the STORE request in step 1548. It should be noted that, as with description of STORE and RETRIEVE requests in previous subsections and various descriptions of data embodiments and configurations for various embodiments of the present invention, many different alternative implementations for execution of STORE requests are possible. Requests for data chunks and transmission of data chunks may be carried out directly between cells and clients, without involving portals in certain embodiments of the present invention. In certain embodiments of the present invention, portals maintain object directories that are used to quickly assess the state of stored objects, while in other embodiments of the present invention, a portal may assess the state of the stored object by parsing object ID in order to inquire of the state of the stored object from the cell that stores the state.

Figure 16A:
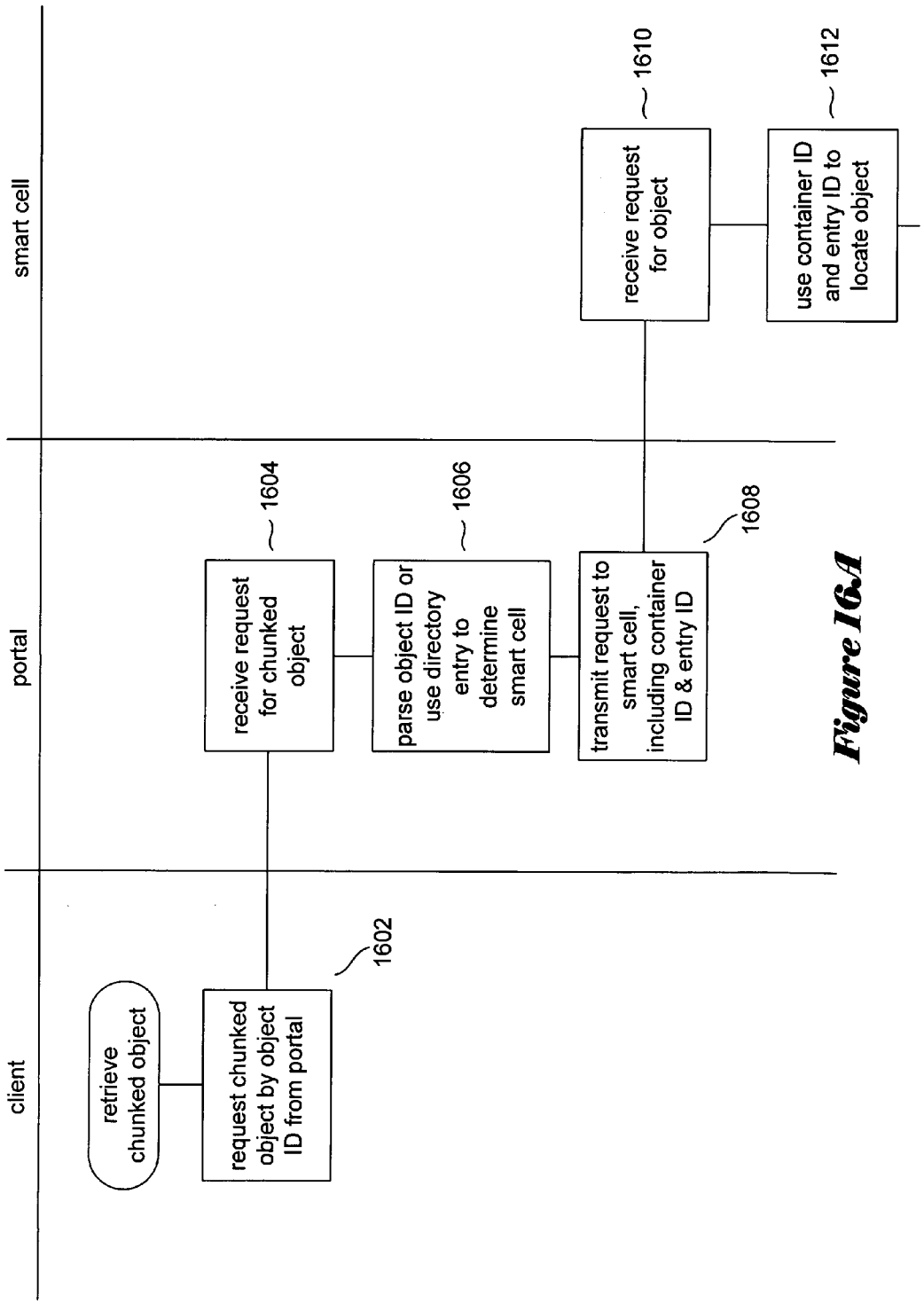
FIGS. 16A-B show control-flow diagrams that illustrate execution of a data-object RETRIEVE request in a distributed, differential electronic-data backup and archiving system that represents one embodiment of the present invention.
Figure 16B:
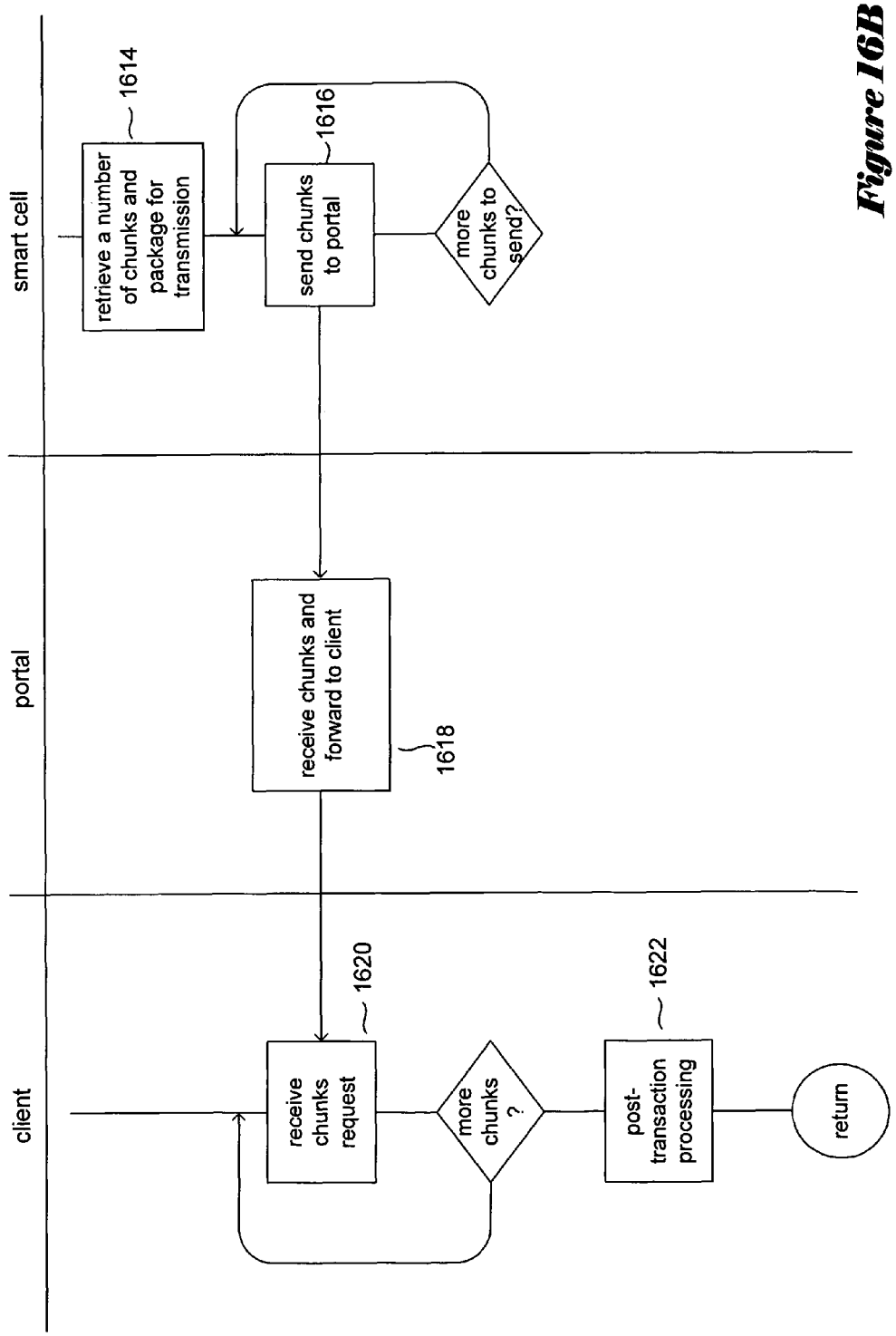

FIGS. 16A-B show control-flow diagrams that illustrate execution of a data-object RETRIEVE request in a distributed, differential electronic-data backup and archiving system that represents one embodiment of the present invention. As shown in FIG. 16A, the RETRIEVE request begins when the front-end application receives a request from higher-level software routines within a client computer to retrieve a chunked object identified either by an object ID or by a higher-level name that is associated with an object ID by the front-end application, in step 1602, and transmits a RETRIEVE request to a portal. In step 1604, the portal receives the RETRIEVE request and, in step 1606, parses the included object ID, or uses an entry in an object directory maintained by the portal and identified by the object ID, to determine the cell in which the object is stored. In step 1608, the portal transmits a RETRIEVE request to the identified cell, including the ID of the container in which the data object is stored and an entry ID identifying the chunked-object entry that represents the data object that is to be retrieved. In step 1610, the cell receives the RETRIEVE request and, in step 1612, uses the included container ID and entry ID to locate the chunked-object entry and all associated chunk entries in which the object is stored. In step 1614, the cell retrieves a number of data chunks and packages them for transmission back to the client. In step 1616, the cell transmits the packaged data chunks to the portal. In step 1618, the portal receives the data chunks and forwards the data chunks to the client. As noted above, step 1618 may be avoided when the cell can directly communicate with the client computer. In step 1620, the client receives the chunks and appropriately places the chunks into a data object which the client assembles as a response to the RETRIEVE request. If more chunks need to be sent, steps 1616, optionally 1618, and 1620 are repeated until the client receives all of the data chunks. Then in step 1622, the front-end application undertakes any post-transaction processing associated with executing a RETRIEVE request.

Although the present invention has been described in terms of particular embodiments, it is not intended that the invention be limited to these embodiments. Modifications within the spirit of the invention will be apparent to those skilled in the art. For example, as discussed above, an almost limitless number of different component organizations, interconnection topologies, functionality partitionings, and STORE and RETRIEVE operation implementations are possible. Many different container, chunked-object entry, data-chunk entry, entry-list node, hash-list node, and other data-structure implementations may be employed. An essentially limitless number of different front-end application, portal, and cell software implementations are possible, using different programming languages, operating-system platforms, modular organizations, data structures, control structures, and various other programming parameters.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A distributed, differential electronic-data backup and archiving system comprising:
 client computers that execute front-end-application components of the distributed, differential electronic-data backup and archiving system, the front-end application components receiving data objects from client computers and sending the received data objects to cells of the distributed, differential electronic-data backup and archiving system for storage; and
 cells within the distributed, differential electronic-data backup and archiving system that store the data objects, each cell comprising at least one computer system with attached mass-storage, each cell storing entire data objects as lists that reference stored, unique data chunks within the cell by content, a cell storing all of the unique data chunks for all data objects stored in the cell.

2. The distributed, differential electronic-data backup and archiving system of claim 1 wherein the front-end-application component of a client computer executes a STORE request received from a higher-level routine within the client computer by:
 generating a list representation of the data object;
 transmitting the list representation of the data object to a processing component of the distributed, differential electronic-data backup and archiving system;
 receiving an indication of data chunks within the data object that need to be transmitted by the front-end-application component to a cell of the distributed, differential electronic-data backup and archiving system; and
 transmitting the needed data chunks to the cell.

3. The distributed, differential electronic-data backup and archiving system of claim 1 wherein the front-end-application component of a client computer generates a list representation of the data object by:
 partitioning the data object into data chunks;
 computing a hash value or other collision-resistant identifier for the contents of each data chunk; and
 composing a list to describe the data object.

4. The distributed, differential electronic-data backup and archiving system of claim 1 wherein each cell includes a hash-value index.

5. The distributed, differential electronic-data backup and archiving system of claim 4 wherein a cell stores a data object by:
 receiving a hash-list representation of the data object;
 identifying hash values within the hash-list representation that are not stored within the hash-value index of the cell;
 requesting data chunks corresponding to the identified hash values not stored within the hash-value index of the cell from the front-end-application component that transmitted the hash-list representation of the data object;
 creating a chunked-object entry within a container object for the data object, and storing the received hash-list representation of the data object within the chunked-object entry;
 receiving the requested data chunks from the front-end-application component; and
 storing the received data chunks within data-chunk entries in containers.

6. The distributed, differential electronic-data backup and archiving system of claim 1 wherein a container object includes:
 meta data;
 an entry list comprising a sequence of entry-list nodes, each entry-list node identifying an entry within the container; and
 one or more entries.

7. The distributed, differential electronic-data backup and archiving system of claim 6 wherein entries include chunked-object entries and data-chunk entries.

8. The distributed, differential electronic-data backup and archiving system of claim 7 wherein each chunked-object entry includes a list comprising a sequence of list entries, each list entry including a collision-resistant content identifier and a reference to a stored data chunk.

9. The distributed, differential electronic-data backup and archiving system of claim 7 wherein each data-chunk object entry includes stored, unique data chunks and back pointers that reference containers with chunked-object entries that reference one or more stored, unique data chunks within the data-chunk entry.

10. The distributed, differential electronic-data backup and archiving system of claim 1 further including one or more portal computers that receive requests from front-end-application components of client computers and forward the received requests to cells of the distributed, differential electronic-data backup and archiving system for execution.

11. The distributed, differential electronic-data backup and archiving system of claim 1 wherein each stored data object is uniquely identified by an object ID.

12. The distributed, differential electronic-data backup and archiving system of claim 11 wherein each object ID is computed from:
- a cell ID that identifies a cell in which the data object identified by the object ID is stored;
- a container ID that identifies a container object within the cell in which a chunked-object entry or other entry representing the stored data object; and
- an entry ID that identifies an entry within the container that stores the chunked-object entry or other entry representing the stored data object.

13. The method of claim 1 further including uniquely identifying each stored data object within distributed, differential electronic-data backup and archiving system by an object ID.

14. The method of claim 13 further including computing each object ID from:
- a cell ID that identifies a cell in which the data object identified by the object ID is stored;
- a container ID that identifies a container object within the cell in which a chunked-object entry or other entry representing the stored data object; and
- an entry ID that identifies an entry within the container that stores the chunked-object entry or other entry representing the stored data object.

15. A method for backing up and archiving a data object on behalf of a client computer, the method comprising:
- providing a distributed, differential electronic-data backup and archiving system comprising
  - a front-end-application component of the distributed, differential electronic-data backup and archiving system that executes on the client computer, and
  - cells within the distributed, differential electronic-data backup and archiving system that store the data objects, each cell comprising at least one computer system with attached mass-storage;
- receiving, by the front-end-application component, a request to store an object;
- transmitting a STORE request to a cell within the distributed, differential electronic-data backup and archiving system; and
- storing the data object, by the cell within the distributed, differential electronic-data backup and archiving system, as a list that references stored, unique data chunks within the cell by content, the cell storing all of the unique data chunks for all data objects stored in the cell.

16. The method of claim 15 wherein the front-end-application component of the client computer transmits a STORE request by:
- generating a list representation of the data object;
- transmitting the list representation of the data object to the cell within the distributed, differential electronic-data backup and archiving system;
- receiving an indication of data chunks within the data object that need to be transmitted by the front-end-application component to the cell within the distributed, differential electronic-data backup and archiving system; and
- transmitting the needed data chunks to the cell.

17. The method of claim 15 wherein the front-end-application component of the client computer generates a list representation of the data object by:
- partitioning the data object into data chunks;
- computing a collision-resistant content identifier for each data chunk; and
- composing a hash list to describe the data object.

18. The method of claim 15
wherein each cell includes a hash-value index; and
wherein a cell stores a data object by:
- receiving a hash-list representation of the data object,
- identifying hash values within the hash-list representation that are not stored within the hash-value index of the cell,
- requesting data chunks corresponding to the identified hash values not stored within the hash-value index of the cell from the front-end-application component,
- creating a chunked-object entry within a container object for the data object, and storing the received hash-list representation of the data object within the chunked-object entry,
- receiving the requested data chunks from the front-end-application component, and
- storing the received data chunks within data-chunk entries in containers.

19. The method of claim 18 wherein each container object includes:
- meta data;
- an entry list comprising a sequence of entry-list nodes, each entry-list node identifying an entry within the container;
- and one or more entries.

20. The method of claim 19
wherein entries include chunked-object entries and data-chunk entries;
wherein each chunked-object entry includes a hash list comprising a sequence of hash-list entries, each hash-list entry including a hash value and a reference to a store data chunk; and
wherein each data-chunk object entry includes stored, unique data chunks and back pointers that reference containers with chunked-object entries that reference one or more stored, unique data chunks within the data-chunk entry.

* * * * *

UNITED STATES PATENT AND TRADEMARK OFFICE
CERTIFICATE OF CORRECTION

PATENT NO. : 8,862,841 B2  
APPLICATION NO. : 11/411385  
DATED : October 14, 2014  
INVENTOR(S) : Samuel A. Fineberg et al.

It is certified that error appears in the above-identified patent and that said Letters Patent is hereby corrected as shown below:

In the Specification

In column 5, line 25, delete "344-343" and insert -- 340-344 --, therefor.

Signed and Sealed this
Fifteenth Day of September, 2015

Michelle K. Lee
*Director of the United States Patent and Trademark Office*